(12) United States Patent
Tokunaga et al.

(10) Patent No.: US 8,326,082 B2
(45) Date of Patent: Dec. 4, 2012

(54) IMAGE PROCESSING APPARATUS, IMAGE PROCESSING METHOD, AND PROGRAM

(75) Inventors: Nodoka Tokunaga, Tokyo (JP); Kazuki Aisaka, Kanagawa (JP); Masatoshi Yokokawa, Kanagawa (JP); Jun Murayama, Tokyo (JP)

(73) Assignee: Sony Corporation, Tokyo (JP)

( * ) Notice: Subject to any disclaimer, the term of this patent is extended or adjusted under 35 U.S.C. 154(b) by 124 days.

(21) Appl. No.: 13/022,145

(22) Filed: Feb. 7, 2011

(65) Prior Publication Data

US 2011/0206295 A1 Aug. 25, 2011

(30) Foreign Application Priority Data

Feb. 25, 2010 (JP) ................................. 2010-040697

(51) Int. Cl.
*G06K 9/36* (2006.01)
(52) U.S. Cl. ........ 382/282; 382/163; 382/190; 382/220; 382/256
(58) Field of Classification Search .................. 382/163, 382/190, 220, 256, 282
See application file for complete search history.

(56) References Cited

U.S. PATENT DOCUMENTS

| 5,917,934 | A  | * | 6/1999 | Chiu et al. | 382/149 |
| 6,333,993 | B1 | * | 12/2001 | Sakamoto | 382/173 |
| 7,151,547 | B2 | * | 12/2006 | Lin et al. | 345/627 |
| 2005/0276477 | A1 | * | 12/2005 | Lin et al. | 382/173 |
| 2006/0280352 | A1 | * | 12/2006 | Muschler et al. | 382/133 |
| 2010/0066745 | A1 | * | 3/2010 | Tsuda et al. | 345/473 |

FOREIGN PATENT DOCUMENTS

| JP | 2001-236497 |   | 8/2001 |
| JP | 2001236497 | * | 8/2001 |
| JP | 2002-16792 |   | 1/2002 |
| JP | 2002016792 | * | 1/2002 |
| JP | 2002-218223 |   | 8/2002 |
| JP | 2002218223 | * | 8/2002 |
| JP | 2005-175683 |   | 6/2005 |
| JP | 2005-175684 |   | 6/2005 |
| JP | 2005175683 | * | 6/2005 |
| JP | 2005175684 | * | 6/2005 |

OTHER PUBLICATIONS

Gaze—Cropping, Santella et al., ACM, 1-59593-178-3, 2006, pp. 1-10.*

* cited by examiner

*Primary Examiner* — Jayesh A Patel
(74) *Attorney, Agent, or Firm* — Oblon, Spivak, McClelland, Maier & Neustadt, L.L.P.

(57) ABSTRACT

An image processing apparatus includes: a subject region detection unit detecting regions of subjects included in an input image; a cropped region setting unit setting a region including all of the regions of the detected subjects as a cropped region; an expansion region addition unit adding an expansion region to expand an end of the cropped region only by a predetermined width; a cutting unit cutting a cut image formed from a cut region including the cropped region and the expansion region from the input image; a subject adaptation size change unit changing a size of an image formed from the cut region by deleting a region where an influence on the subjects is small in the cut image; and an entire image size changing unit changing the size of the entire image changed in size by the subject adaptation size change unit at a predetermined ratio.

7 Claims, 27 Drawing Sheets

FIG. 11
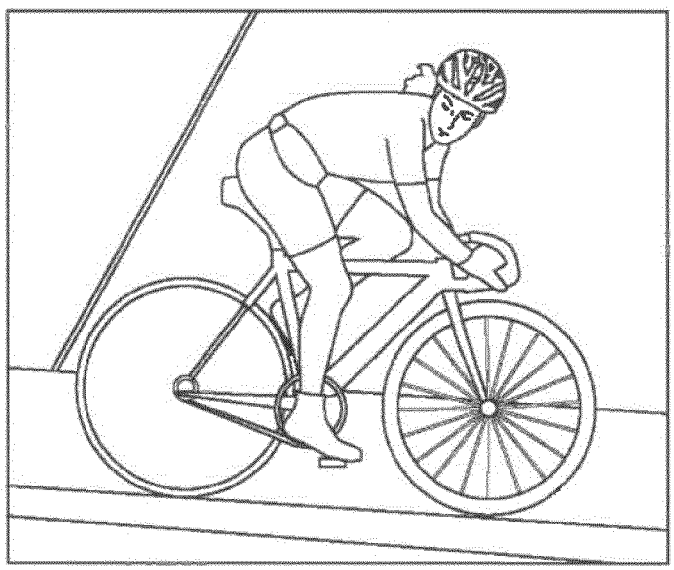
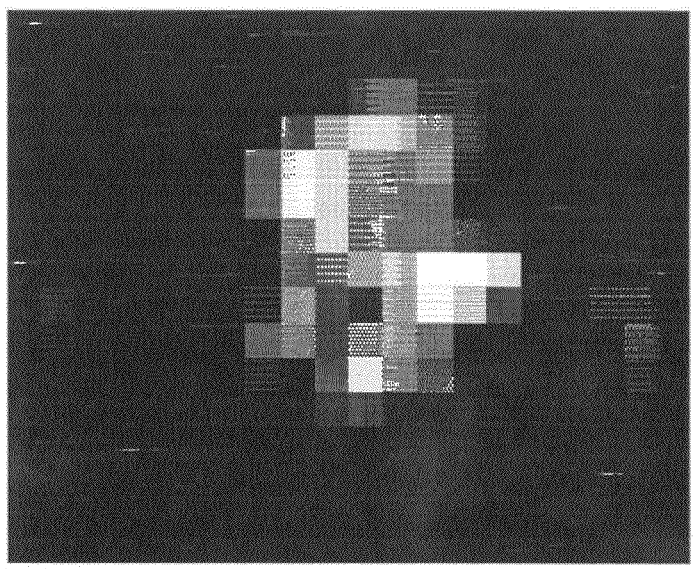

FIG. 12
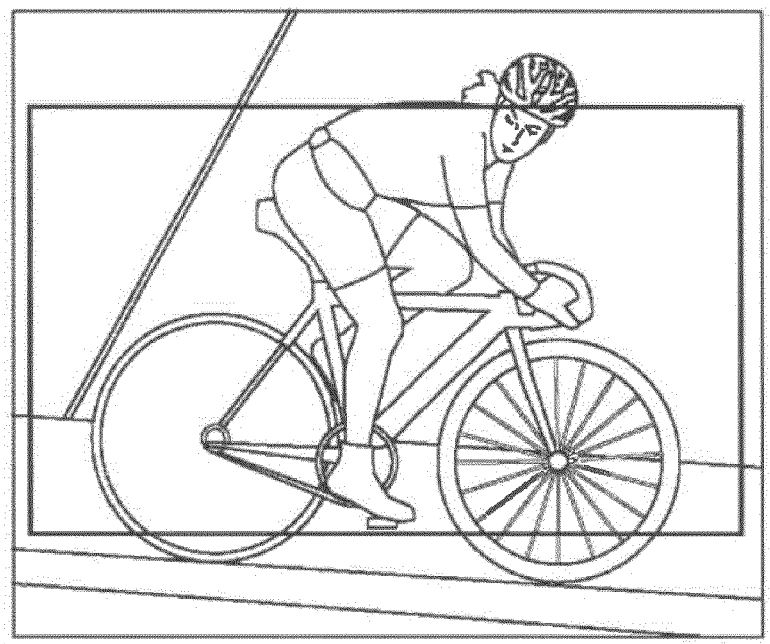
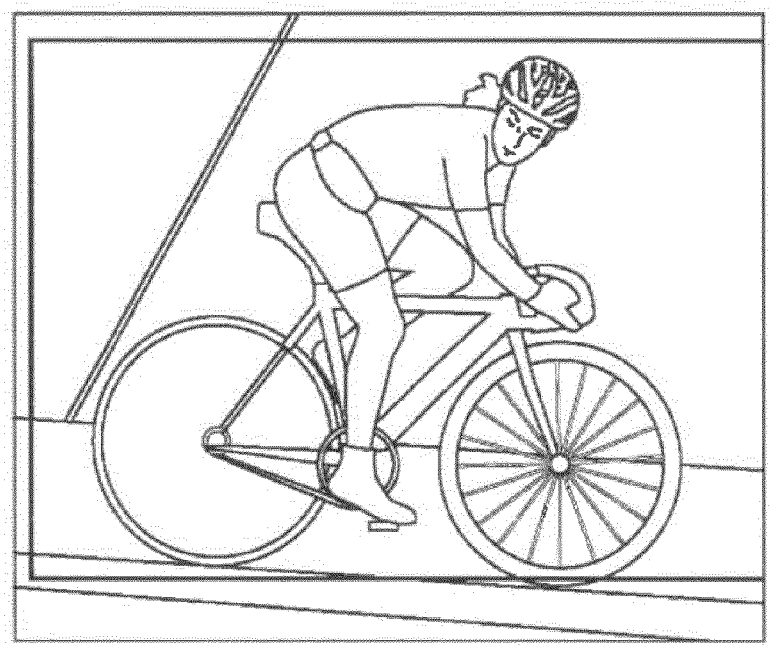

FIG. 18
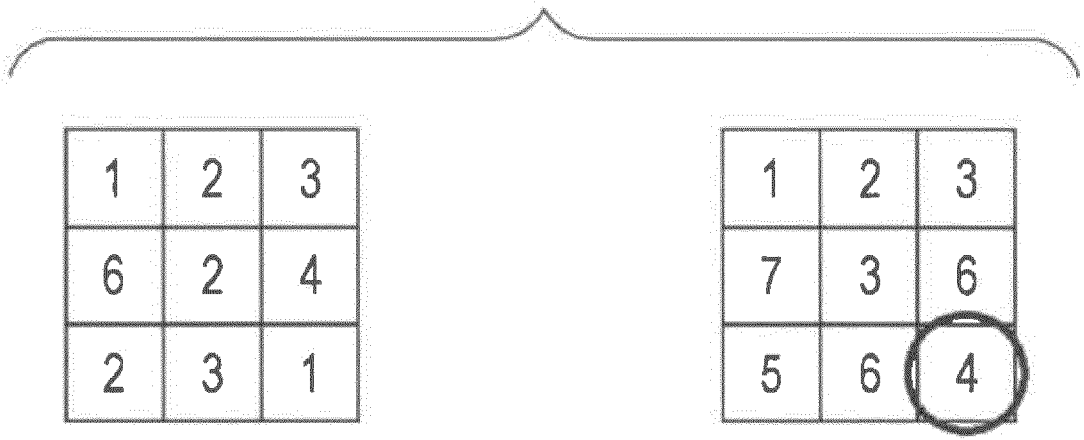
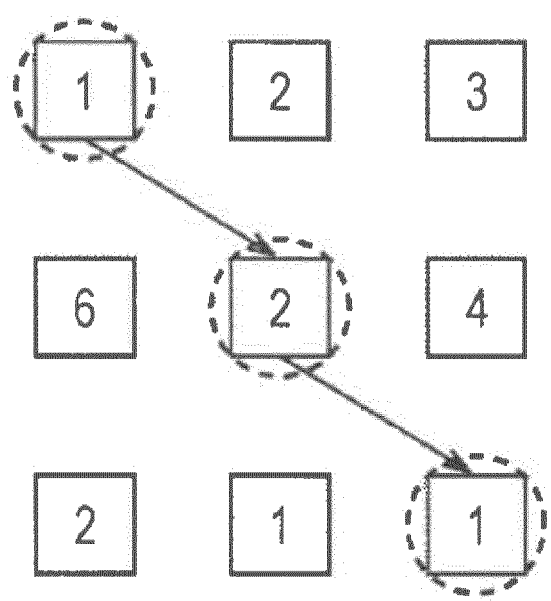

FIG. 22
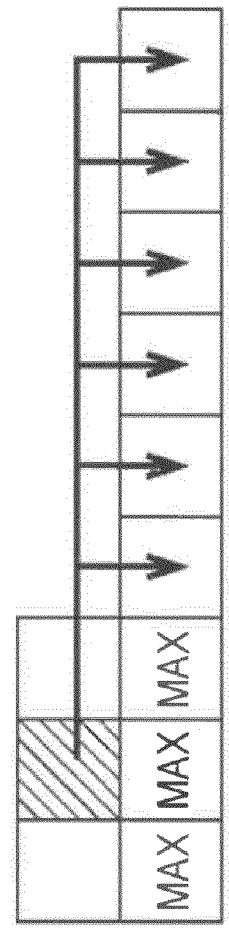
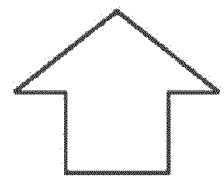
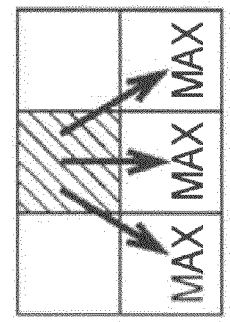

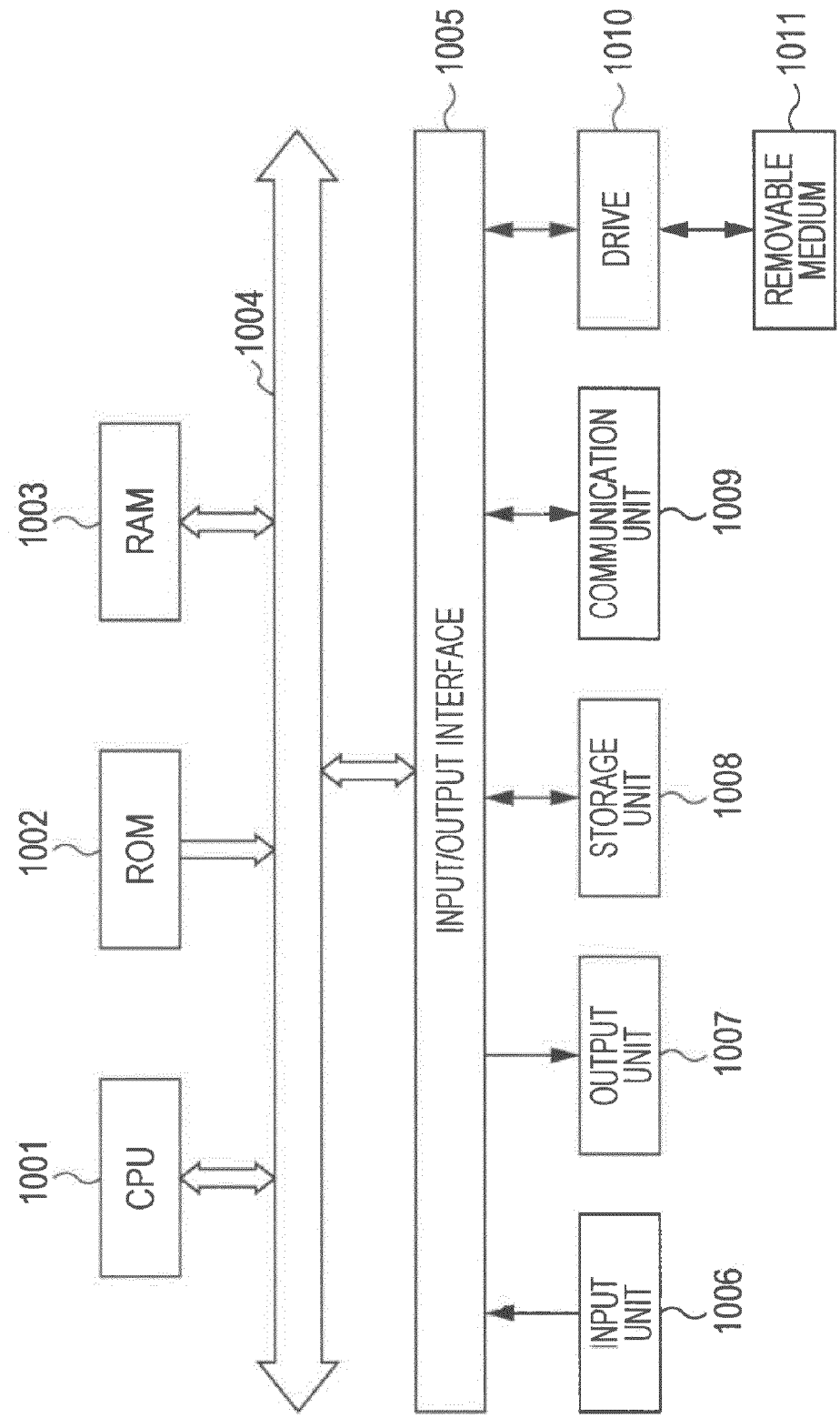

IMAGE PROCESSING APPARATUS, IMAGE PROCESSING METHOD, AND PROGRAM

BACKGROUND OF THE INVENTION

1. Field of the Invention

The present invention relates to an image processing apparatus, an image processing method, and a program, and more particularly, to an image processing apparatus, an image processing method, and a program capable of reducing an image when reducing the image, while reducing a subject in the image as little as possible.

2. Description of the Related Art

In recent years, high-resolution images are being increasingly photographed due to the high capability of digital cameras. On the other hand, as mobile terminals have come into wide use, the opportunity to view images photographed with digital cameras on small-sized screens is ever more increasing. When an image with a high resolution is viewed on a small-sized screen, the entire image may not be viewed on one screen without a change in the size of the image. Therefore, the entire image is generally reduced to match the size of the screen for display. Then, when the entire image is reduced so as to be small, an object as a subject may be reduced. Therefore, it is sometimes difficult to see the details of the image.

For example, a technique for selecting a plurality of cropped regions has been suggested (see Japanese Unexamined Patent Application Publication No. 2005-175683). A technique has also been suggested in which a portrait mode used to photograph a person or a scenery mode used to photograph scenery as a subject is manually or automatically selected and a cropped region is detected according to the modes (see Japanese Unexamined Patent Application Publication No. 2005-175684).

A technique has also been suggested in which the size and shape of a crop window are selected and cropping is performed using the size and shape of the crop window (see Japanese Unexamined Patent Application Publication No. 2002-16792). A technique has also been suggested in which a subject region is detected and cropped by allocating portions with a high value in a belief map (see Japanese Unexamined Patent Application Publication No. 2002-218223). A technique has also been suggested in which a subject region is detected and cropped by allocating portions with a high value in a belief map (see Japanese Unexamined Patent Application Publication No. 2001-236497).

SUMMARY OF THE INVENTION

In the technique disclosed in Japanese Unexamined Patent Application Publication No. 2005-175683, however, a plurality of cropped regions can be selected, but a problem may arise in that the plurality of cropped regions are not integrally formed. In the technique disclosed in Japanese Unexamined Patent Application Publication No. 2005-175684, however, a mode selection process is necessary. Therefore, a problem may arise in that labor (in the manual mode selection) is necessary or time (in the automatic mode selection) is necessary. Moreover, since a plurality of algorithms is stored, a large-capacity memory may be necessary and thus the apparatus may become costly.

In the technique disclosed in Japanese Unexamined Patent Application Publication No. 2002-16792, however, it takes some time to select the size or shape of the crop window and there is a possibility that a subject region is cut depending on the size or shape of the crop window. In the technique disclosed in Japanese Unexamined Patent Application Publication No. 2002-218223, however, there is a possibility that the subject region is cut in such a case as when there is a plurality of subjects. In the technique disclosed in Japanese Unexamined Patent Application Publication No. 2001-236497, however, there is a possibility that the subject is cut in such a case as when there is a plurality of subjects.

It is desirable to provide a technique for reducing the size of an image so as not to omit an object as a subject, particularly when reducing the size of the image, and a technique for reducing the size of an image so as not to excessively reduce the size of the image, while reducing a calculation cost.

According to an embodiment of the invention, there is provided an image processing apparatus including: subject region detection means for detecting regions of subjects included in an input image; cropped region setting means for setting a region including all of the regions of the subjects detected by the subject region detection means as a cropped region; expansion region addition means for adding an expansion region to expand an end of the cropped region only by a predetermined width; cutting means for cutting a cut image formed from a cut region including the cropped region and the expansion region from the input image; subject adaptation size changing means for changing a size of an image formed from the cut region by deleting a region where an influence on the subjects is small in the cut image; and entire image size changing means for changing the size of the entire image changed in size by the subject adaptation size changing means at a predetermined ratio.

The subject adaptation size changing means may include input image energy map generation means for generating an input image energy map from the cut image based on energies of adjacent pixels of the cut image; reduced energy map generation means for generating a reduced energy map corresponding to a reduced image, which is formed by setting one block formed by a plurality of adjacent pixels of the cut image as one pixel, by reducing the input image energy map; reduction seam search means for searching a reduction seam formed by binding pixels of a path along which a cumulative energy value is minimum among a plurality of paths formed from a pixel located at one end of the reduced image to pixels at the other end of the reduced image sequentially via the pixels adjacent in a direction of the other end in the reduced energy map; partial seam search means for searching a partial seam formed by binding pixels with a minimum cumulative value of the energies of the pixels among a plurality of paths formed from a pixel located at one end, which includes an end of the reduction seam searched by the reduction seam search means, of the cut image in the input image energy map to pixels located at the other end of the cut image sequentially via the pixels adjacent in a direction of the other end; and reduction means for reducing the input image by deleting the pixels forming the partial seam searched by the partial seam search means from the input image.

The image processing apparatus may further include comparison means for comparing a cumulative value of the energies of the pixels forming the searched partial seam to a threshold value. The partial seam search means may repeatedly search the partial seam formed by binding the pixels with the minimum cumulative value among the plurality of paths formed from a pixel located at one end, which includes the end of the reduction seam searched by the reduction seam search means, of the cut image in the input image energy map to the pixels located at the other end of the cut image sequentially via the pixels adjacent in the direction of the other end, until the comparison means determines that the cumulative value of the energies of the pixels forming the searched partial seam is larger than the threshold value.

The image processing apparatus may further include input image energy map update means for updating the input image energy map by inserting and replacing a maximum energy value into the energies corresponding to all of the pixels, which form the partial seam searched by the partial seam search means, of the cut image on the input image energy map. When the partial seam search means searches the plurality of paths formed from the pixel located at the one end of the cut image to the pixels located at the other end of the cut image sequentially via the pixels adjacent in the direction of the other end, the partial seam search means may form the paths by setting the pixels with the minimum energy as the adjacent pixels among a predetermined number of pixels adjacent to the adjacent pixels when all of the adjacent pixels have the maximum energy value of the input image energy map.

The image processing apparatus may further include reduced image energy map update means for updating the reduced image energy map by inserting and replacing the maximum energy value into the energies corresponding to all of the pixels, which form the partial seam searched by the partial seam search means, of the reduced image on the reduced image energy map.

According to another embodiment of the invention, there is provided an image processing method of an image processing apparatus which includes subject region detection means for detecting regions of subjects included in an input image, cropped region setting means for setting a region including all of the regions of the subjects detected by the subject region detection means as a cropped region, expansion region addition means for adding an expansion region to expand an end of the cropped region only by a predetermined width, cutting means for cutting a cut image formed from a cut region including the cropped region and the expansion region from the input image, subject adaptation size changing means for changing a size of an image formed from the cut region by deleting a region where an influence on the subjects is small in the cut image, and entire image size changing means for changing the size of the entire image changed in size by the subject adaptation size changing means at a predetermined ratio. The image processing method includes the steps of: detecting, by subject region detection means, the regions of the subjects included in the input image; setting, by cropped region setting means, the region including all of the regions of the subjects detected in the step of detecting the subject region as the cropped region; adding, by expansion region addition means, the expansion region to expand the end of the cropped region only by the predetermined width; cutting, by cutting means, the cut image formed from the cut region including the cropped region and the expansion region from the input image; changing, by subject adaptation size changing means, the size of the image formed from the cut region by deleting the region where the influence on the subjects is small in the cut image; and changing, by entire image size changing means, the size of the entire image changed in size in the step of changing the subject adaptation size at the predetermined ratio.

According to still another embodiment of the invention, there is provided a program causing a computer controlling an image processing apparatus which includes subject region detection means for detecting regions of subjects included in an input image, cropped region setting means for setting a region including all of the regions of the subjects detected by the subject region detection means as a cropped region, expansion region addition means for adding an expansion region to expand an end of the cropped region only by a predetermined width, cutting means for cutting a cut image formed from a cut region including the cropped region and the expansion region from the input image, subject adaptation size changing means for changing a size of an image formed from the cut region by deleting a region where an influence on the subjects is small in the cut image, and entire image size changing means for changing the size of the entire image changed in size by the subject adaptation size changing means at a predetermined ratio, to execute the steps of: detecting, by subject region detection means, the regions of the subjects included in the input image; setting, by cropped region setting means, the region including all of the regions of the subjects detected in the step of detecting the subject region as the cropped region; adding, by expansion region addition means, the expansion region to expand the end of the cropped region only by the predetermined width; cutting, by cutting means, the cut image formed from the cut region including the cropped region and the expansion region from the input image; changing, by subject adaptation size changing means, the size of the image formed from the cut region by deleting the region where the influence on the subjects is small in the cut image; and changing, by entire image size changing means, the size of the entire image changed in size in the step of changing the subject adaptation size at the predetermined ratio.

According to still another embodiment of the invention, regions of subjects included in an input image are detected, a region including all of the regions of the detected subjects is set as a cropped region, an expansion region is added to expand an end of the cropped region only by a predetermined width, a cut image formed from a cut region including the cropped region and the expansion region is cut from the input image, a size of an image formed from the cut region is changed by deleting a region where an influence on the subjects is small in the cut image, and the size of the entire image changed in size is changed at a predetermined ratio.

The image processing apparatus according to the embodiments of the invention may be an independent apparatus or a block performing image processing.

According to the embodiments of the invention, it is possible to reduce an image while reducing a subject in an image as little as possible when reducing the image.

BRIEF DESCRIPTION OF THE DRAWINGS

FIG. 11 is a diagram illustrating the image cropping process.

FIG. 12 is a diagram illustrating the image cropping process.

FIG. 18 is a diagram illustrating the process of searching the entire image.

FIG. 22 is a diagram illustrating the process of searching the partial image.

FIG. 27 is a diagram illustrating an exemplary configuration of a general personal computer.

DESCRIPTION OF THE PREFERRED EMBODIMENTS

Exemplary Configuration of Image Processing Apparatus

Figure 1:
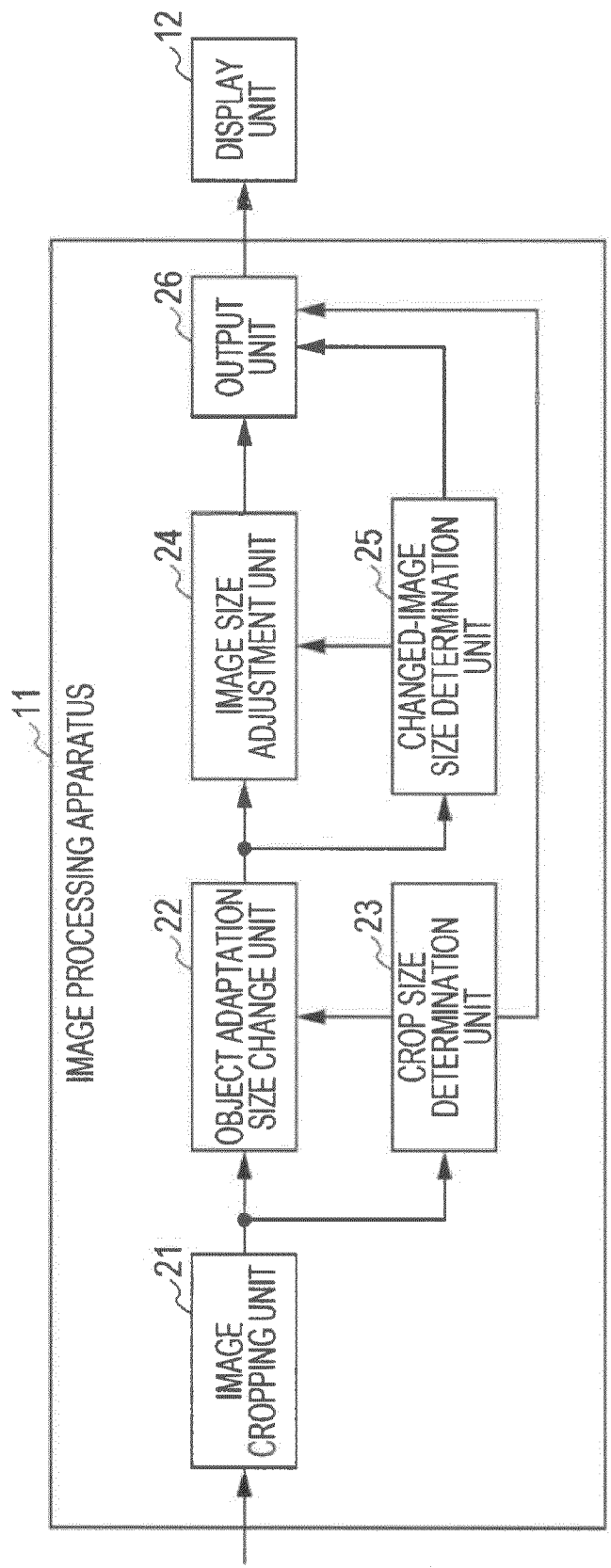
FIG. 1 is a block diagram illustrating an exemplary configuration of an image processing apparatus according to an embodiment of the invention.

FIG. 1 is a diagram illustrating an exemplary configuration of a hardware image processing apparatus according to an embodiment of the invention. An image processing apparatus 11 in FIG. 1 changes the entire size of an image so that the size of an object as a subject in the image is changed as little as possible, when the image processing apparatus 11 reduces or expands the image to a predetermined size. Then, the image processing apparatus 11 displays the image on a display unit 12. Hereinafter, a configuration for reducing an input image will be described, but the same is applied to a case in which an input image is expanded by the same configuration and the same function.

More specifically, the image processing apparatus 11 includes an image cropping unit 21, an object adaptation size changing unit 22, a crop size determination unit 23, an image size adjustment unit 24, a changed-image size determination unit 25, and an output unit 26.

The image cropping unit 21 detects the region of an object as a subject in the input image, generates a rectangular crop image including a range detected as the region of the object, and supplies the rectangular crop image to the object adaptation size changing unit 22 and the crop size determination unit 23. The configuration of the image cropping unit 21 will be described in detail below with reference to FIG. 2.

The crop size determination unit 23 determines whether the size of the crop image supplied from the image cropping unit 21 is reduced to a predetermined optimum size of the image suitable to be displayed on the display unit 12. When it is determined that the size of the crop image is the optimum size of the image, the crop image is output as a reduced image to the output unit 26. On the other hand, when it is determined that the size of the crop image is not reduced to the predetermined size of the image, the crop size determination unit 23 controls the object adaptation size changing unit 22 to reduce the crop image so that the object as a subject in the crop image is reduced as little as possible.

The object adaptation size changing unit 22 reduces the crop image so that the object in the image is reduced as little as possible by so-called seam carving, and then outputs the reduced crop image to the image size adjustment unit 24 and the changed-image size determination unit 25. The object adaptation size changing unit 22 will be described in detail below with reference to FIG. 4.

The changed-image size determination unit 25 determines whether the size of the image with the reduced crop image supplied from the object adaptation size changing unit 22 is reduced to an optimum size of the image suitable to be displayed on the display unit 12. Then, when the changed-image size determination unit 25 determines that the size of the image is reduced to the optimum size of the image suitable to be displayed on the display unit 12, the changed-image size determination unit 25 outputs the reduced image to the output unit 26 without change. On the other hand, when the changed-image size determination unit 25 determines that the size of the image is not the optimum size of the image, the changed-image size determination unit 25 allows the image size adjustment unit 24 to reduce the entire image so that the reduced crop image has an optimum size suitable to be displayed on the display unit 12, and then outputs the reduced image to the output unit 26. The output unit 26 outputs the reduced input image supplied from one of the crop size determination unit 23, the image size adjustment unit 24, and the changed-image size determination unit 25 to the display unit 12 in order to display the reduced input image.

Exemplary Configuration of Image Cropping Unit

Figure 2:
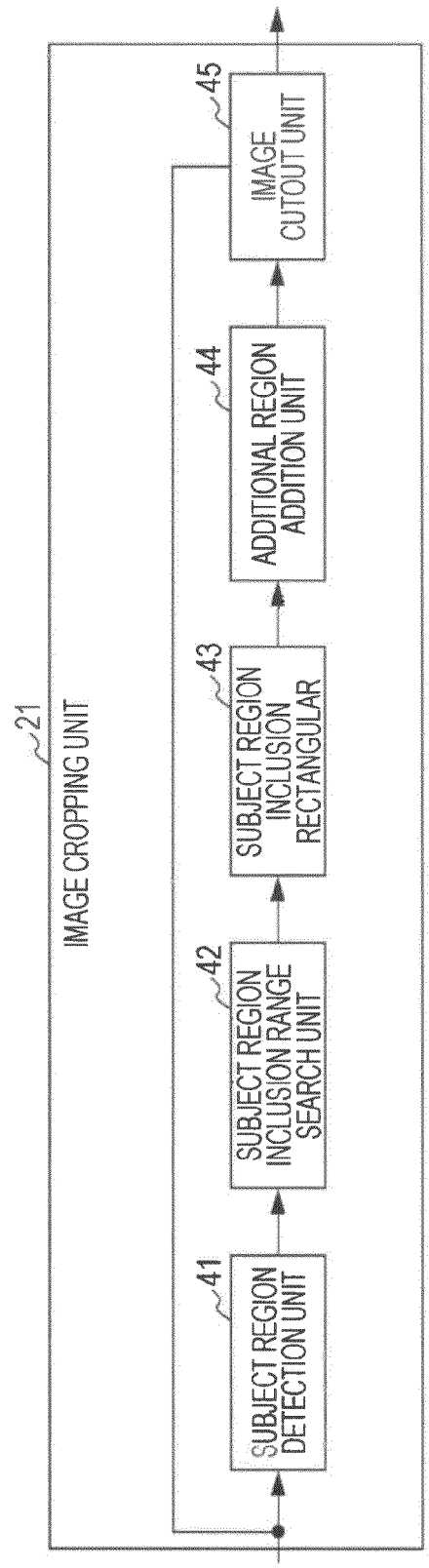
FIG. 2 is a block diagram illustrating an exemplary configuration of an image cropping unit.

Next, an exemplary configuration of the image cropping unit 21 will be described with reference to FIG. 2.

The image cropping unit 21 includes a subject region detection unit 41, a subject region inclusion range search unit 42, a subject region inclusion rectangular range formation unit 43, an additional region addition unit 44, and an image cutout unit 45. The subject region detection unit 41 detects a region where there is an object as a subject in the input image and supplies information regarding the region where there is the object as a subject to the subject region inclusion range search unit 42. The subject region detection unit 41 will be described in detail below with reference to FIG. 3.

The subject region inclusion range search unit 42 searches a positional range including the region where there is the object as a subject supplied from the subject region detection unit 41 and supplies the searched range to the subject region inclusion rectangular range formation unit 43. The subject region inclusion rectangular range formation unit 43 processes the positional range including the region where there is the object as a subject, which is supplied from the subject region inclusion range search unit 42, into a rectangular shape, and supplies the processed range to the additional region addition unit 44. The additional region addition unit 44 adds an additional region with a predetermined width to the outer circumferential end of the rectangular positional range including the region where there is the object as a subject, and supplies the rectangular positional range to the image cutout unit 45. The image cutout unit 45 cuts the input image so as to correspond to the rectangular positional range, to which the additional region supplied from the additional region addition unit 44 is added, including the region where there is the object as a subject, and outputs the cut input image as a crop image.

Exemplary Configuration of Subject Region Detection Unit

Figure 3:
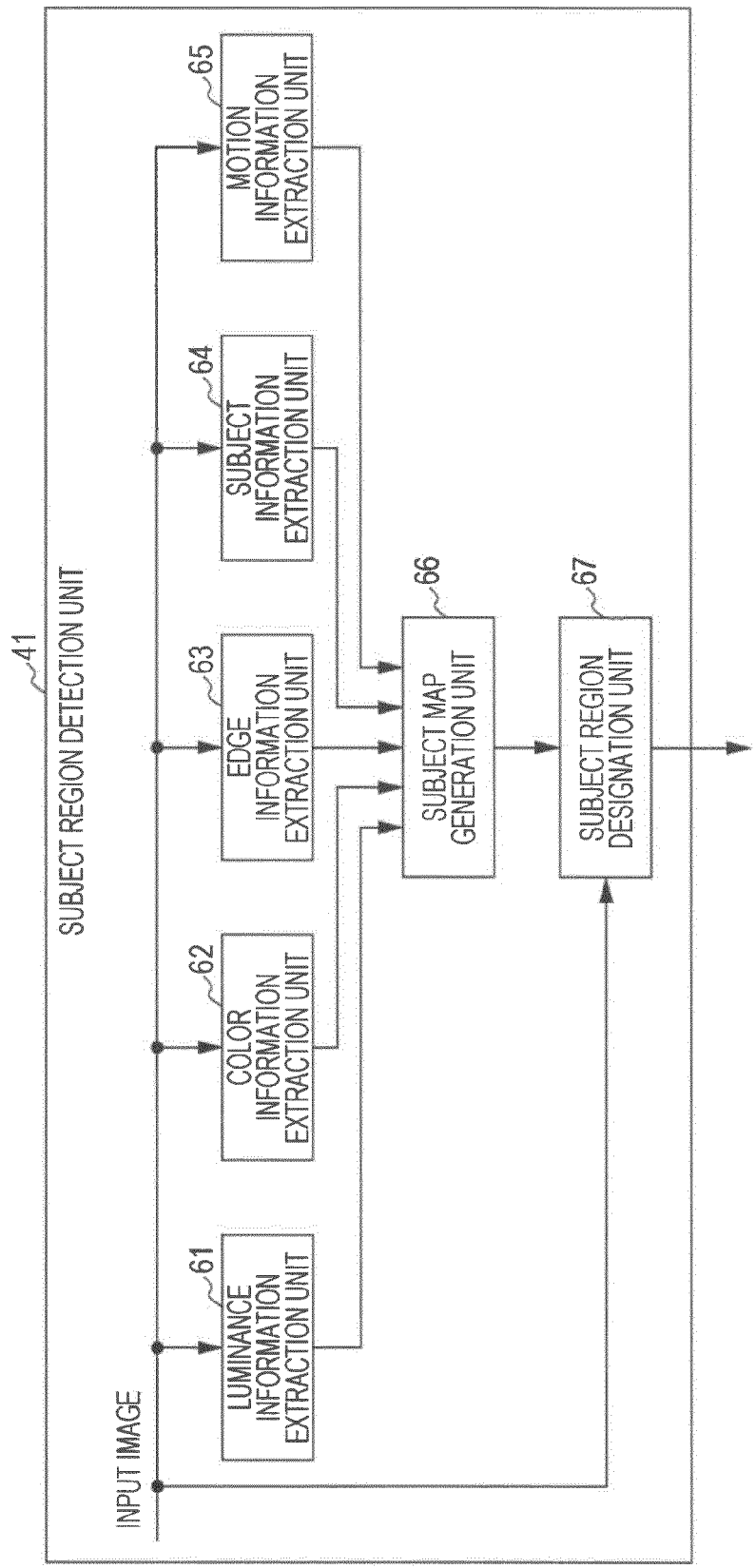
FIG. 3 is a block diagram illustrating an exemplary configuration of a subject region detection unit.

Next, an exemplary configuration of the subject region detection unit 41 will be described with reference to FIG. 3.

The subject region detection unit 41 includes a luminance information extraction unit 61, a color information extraction unit 62, an edge information extraction unit 63, a subject information extraction unit 64, a motion information extraction unit 65, a subject map generation unit 66, and a subject region designation unit 67.

The luminance information extraction unit 61 to the motion information extraction unit 65 extract predetermined information from the supplied input image and generate an information map indicating the region of a subject in each region of the input image based on an extracted-information image configured from the extracted information. Information included in the information map is information indicating a huge amount of a feature included by the region where a subject is included, and a map in which the information is arranged in correspondence with each region of the input image is the information map. That is, the information map can be said to be information indicating the feature amount in each region of the input image.

Here, a subject is an object estimated for a user to mainly observe in the input image, that is, for a user to be interested in, when the user views the input image. Therefore, the subject is not necessarily limited to a person. The luminance information extraction unit 61 to the motion information extraction unit 65 generate a luminance information map, a color information map, an edge information map, a face information map, and a motion information map, respectively, as information maps.

Specifically, the luminance information extraction unit 61 generates the luminance information map in which a luminance image formed from a Y (luminance) component of the supplied input image is used as the extracted-information image, and supplies the luminance information map to the subject map generation unit 66. The color information extraction unit 62 generates the color information map in which a Cr image formed from a Cr component of the supplied input image and a Cb image formed from a Cb component of the supplied input mage are used as the extracted-information images, and supplies the color information map to the subject map generation unit 66.

The edge information extraction unit 63 generates the edge information map in which an edge image formed from an edge intensity of each region of the supplied input image is used as the extracted-information image, and supplies the edge information map to the subject map generation unit 66. The subject information extraction unit 64 generates the subject information map in which an image formed from information regarding a subject (for example, the face of a person) in each region of the supplied input image is used as the extracted-information image, and supplies the subject information map to the subject map generation unit 66. The motion information extraction unit 65 generates the motion information map in which an image formed from information regarding motion in each region of the supplied input image is used as the extracted-information image, and supplies the motion information map to the subject map generation unit 66.

The subject map generation unit 66 generates a subject map by adding the information maps supplied from the luminance information extraction unit 61 to the motion information extraction unit 65 to each other, and supplies the subject map to the subject region designation unit 67. The subject map is information used to designate a region including a subject in the input image.

The subject region designation unit 67 designates the region of a subject on the supplied input image using the subject map from the subject map generation unit 66, and outputs the designation result.

Exemplary Configuration of Object Adaptation Size Changing Unit

Figure 4:
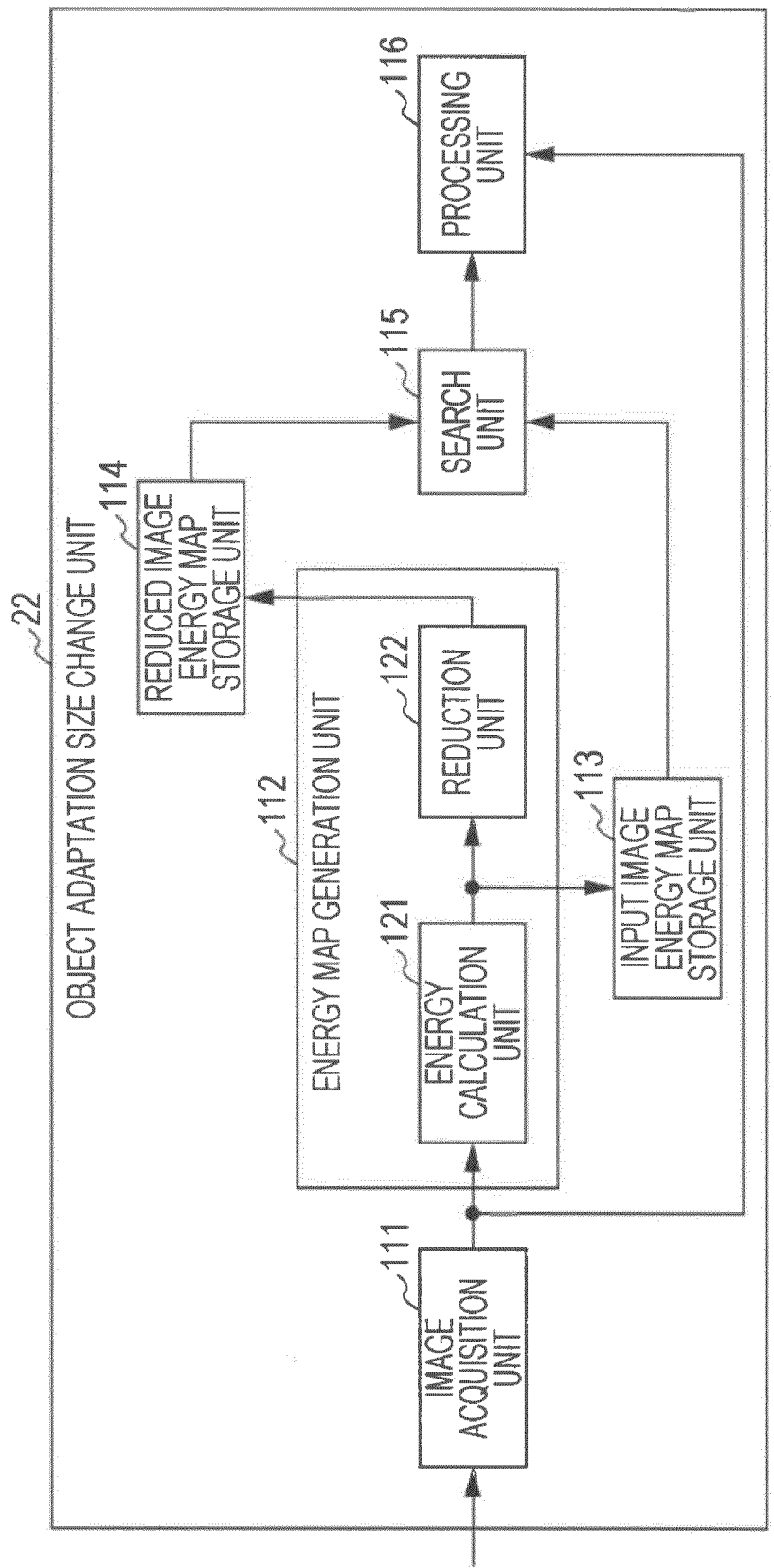
FIG. 4 is a block diagram illustrating an exemplary configuration of an object adaptation size changing unit.

Next, an exemplary configuration of the object adaptation size changing unit 22 will be described with reference to FIG. 4.

The object adaptation size changing unit 22 includes an image acquisition unit 111, an energy map generation unit 112, an input image energy map storage unit 113, a reduced image energy map storage unit 114, a search unit 115, and a processing unit 116.

The image acquisition unit 111 acquires the input image and supplies the input image to the energy map generation unit 112 and the processing unit 116. The energy map generation unit 112 includes an energy calculation unit 121 and a reduction unit 122. The energy map generation unit 112 generates an input image energy map with the same size as that of the input image and a reduced image energy map with the same size as that of the reduced image of the input image from the input image supplied from the image acquisition unit 111. More, specifically, the energy calculation unit 121 calculates energy e(I) of each pixel by Expression (1) below, generates an input image energy map from the energy of a pixel unit so as to correspond to the input image, and stores the input image energy map in the input image energy map storage unit 113. The energy calculation unit 121 supplies the generated input image energy map to the reduction unit 122.

$$e(I) = \left| \frac{\partial}{\partial x} I \right| + \left| \frac{\partial}{\partial y} I \right| \quad (1)$$

In this expression, e(I) represents the energy of each pixel at a position on the input image indicated by I. That is, the energy e(I) of each pixel expressed by Expression (1) indicates the absolute value sum of a difference in the pixel value, the luminance value, or the like between the pixels adjacent to each other in x and y directions in each pixel of the input image.

The reduction unit 122 reduces the input image energy map, which is calculated and generated by the energy calculation unit 121 and has the same size as that of the input image, to generate a reduced image energy map and stores the reduced image energy map in the reduced image energy map storage unit 114. More specifically, the reduction unit 122 generates the reduced image energy map by setting, for example, m by n pixels of the input image as one block, calculating the average value or the intermediate value of the energy of the pixels of each block so that the one block corresponds to one pixel, and constructing the energy map. That is, the reduced image energy map is calculated as an energy map of the reduced image generated so that m by n pixels of the input image are set as one block and the one block corresponds to one pixel.

The search unit 115 reads the reduced image energy map from the reduced image energy map storage unit 114, selects the sequentially adjacent pixels from one end of the reduced image to the other end thereof as a selection path, and searches a reduction seam so that the cumulative value of the energies of the pixels of the selection path is the minimum. In this case, the search unit 115 searches the reduction seam according to a dynamic programming method or a greedy method described below. The search unit 115 replaces the energy of the pixels belonging to the temporarily calculated reduction seam by the maximum energy value and repeatedly performs the same processing until a predetermined number of partial seams are sequentially calculated.

Here, the path formed by the sequentially adjacent pixels from one end of the reduced image to the other end thereof is a path formed by binding the sequentially selected pixels from one of the pixels located at the upper end of the reduced image to one of the pixels located at the lower end of the reduced image via the pixels selected sequentially and repeatedly in the selection procedure in which one pixel is selected from three pixels adjacent right below, immediately below, and left below one pixel. Accordingly, when one end is the left end of the reduced image and the other end is the right end of the reduced image, a path is formed by binding the sequentially selected pixels from one of the pixels located at the left end of the reduced image to one of the pixels located at the right end of the reduced image via the pixels selected sequentially and repeatedly in the selection procedure in which one pixel is selected from three pixels adjacent right above, immediately right, and right below one pixel. Hereinafter, when the reduction seam is searched from the upper end of the reduced image to the lower end thereof, a search direction is called a downward direction. When the reduction seam is searched from the left end of the reduced image to the right end thereof, a search direction is called a rightward direction. In a case where a pixel of interest is set, pixels adjacent to the pixel of interest in the search direction are three pixels adjacent right above, immediately above, and left above the pixel of interest or are three pixels adjacent right below, immediately below, and left below the pixel of interest when the search direction is a vertical direction. When the search direction is a horizontal direction, pixels adjacent to the pixel of interest in the search direction are three pixels adjacent left above, immediately left, and left below the pixel of interest or are three adjacent pixels located right above, immediately right, and right below the pixel of interest.

The search unit 115 sets the pixels with the minimum energy sequentially as the pixel of interest among the pixels which belong to the block corresponding to the pixels of the reduced image forming the reduction seam searched with the reduced image energy map and are sequentially adjacent from the pixel located at the end of the input image. The search unit 115 searches the partial seam by binding the sequentially set pixels of interest. At this time, the search unit 115 searches the partial seam according to the greedy method described below. Then, the search unit 115 replaces the energy corresponding to the pixel belonging to the temporarily calculated partial seam of the input image by the maximum energy value and repeats the same processing until the search unit 115 sequentially calculates the predetermined number of partial seams to calculate the plurality of partial seams.

The processing unit 116 reduces (or expands) the image by deleting (or adding) the pixels corresponding to the partial seams calculated by the search unit 115 from the image supplied from the image acquisition unit 111, and then outputs the reduced (or expanded) image to the display unit 2 to display the reduced (or expanded) image.

Exemplary Configuration of Search Unit

Figure 5:
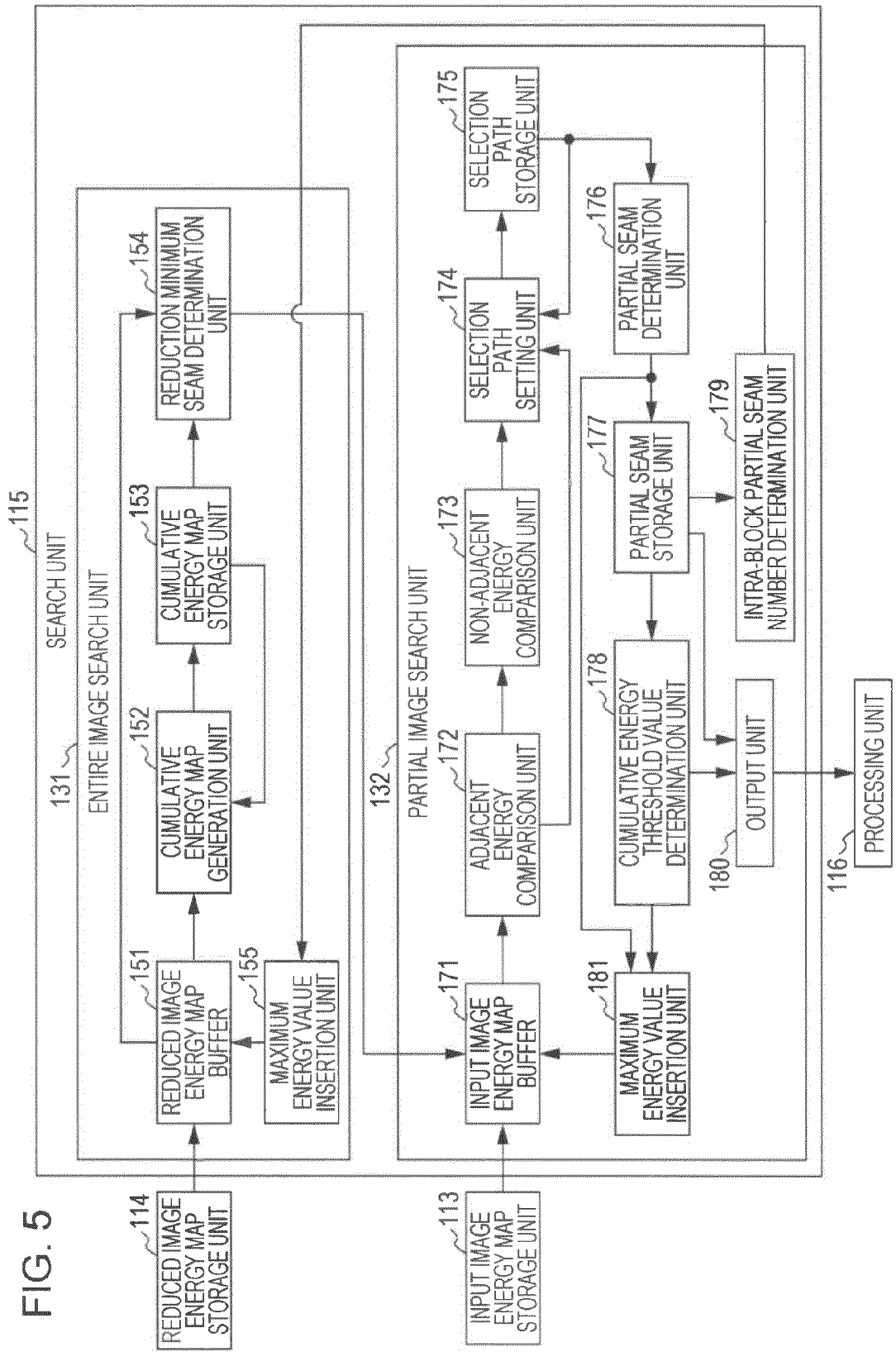
FIG. 5 is a block diagram illustrating an exemplary configuration of a search unit.

Next, an exemplary configuration of the search unit 115 will be described in detail with reference to FIG. 5.

The search unit 115 includes an entire image search unit 131 and a partial image search unit 132. The entire image search unit 131 calculates the reduction seam of the reduced image from the reduced image energy map and supplies the reduction seam to the partial image search unit 132. The partial image search unit 132 calculates the partial seam from the input image energy map based on information regarding the reduction seam supplied from the entire image search unit 131, and outputs the partial seam to the processing unit 116.

First, the configuration of the entire image search unit 131 will be described. The entire image search unit 131 includes a reduced image energy map buffer 151, a cumulative energy map generation unit 152, a cumulative energy map storage unit 153, a reduction seam determination unit 154, and a maximum energy value insertion unit 155. The reduced image energy map buffer 151 reads and temporarily stores the reduced image energy map stored in the reduced image energy map storage unit 114. When the energies of the pixels belonging to the reduction seam are replaced by the maximum energy value inserted from the maximum energy value insertion unit 155 and the reduced image energy map is updated, the reduced image energy map buffer 151 stores the updated reduced image energy map.

The cumulative energy map generation unit 152 sequentially cumulates the energies of the pixels adjacent to the sequentially set pixels of interest in a direction reverse to the search direction of the reduced image energy map by performing calculation of Expression (2) below, and calculates the energies as a cumulative energy.

$$M(i,j) = e(i,j) + \min(M(i-1,j-1), M(i-1,j), M(i-1,j+1)) \quad (2)$$

In this expression, $M(i,j)$ represents a cumulative energy of the sequentially set pixel of interest $(i,j)$. In addition, $e(i,j)$ represents the energy of the pixel of interest $(i,j)$. In addition, $\min(A, B, C)$ represents selection of the minimum value among values of A to C.

That is, the cumulative energy map generation unit 152 calculates the cumulative energy of the pixel of interest $(i,j)$ by selecting the minimum energy from among the cumulative energies $M(i-1,j-1)$, $M(i-1,j)$, and $M(i-1,j+1)$ of the pixels $(i-1,j-1)$, $(i-1,j)$, and $(i-1,j+1)$ adjacent to the pixel of interest $(i,j)$ in a direction reverse to the search direction of the reduction seam and adding the minimum energy to the energy of the pixel of interest. The cumulative energy map generation unit 152 generates the cumulative energy map of the reduced image energy map by sequentially repeating the same processing and stores the cumulative energy map in the cumulative energy map storage unit 153. In Expression (2), an example is shown in which the reduction seam is searched from the upper end of the input image to the lower end thereof in the vertical direction. Therefore, Expression (2) varies so as to correspond to the search direction of the reduction seam.

Based on information regarding the cumulative energy map stored in the cumulative energy map storage unit 153, the reduction seam determination unit 154 sequentially searches the reduction seam so that the cumulative value of the energies of the pixels selected as the selection path from the pixel located at one end of the reduced image is the minimum. The reduction seam determination unit 154 determines, as the reduction seam, the path binding the pixels of which the cumulative energy is the minimum, and supplies the determined reduction seam to the partial image search unit 132. The reduction seam determination unit 154 supplies information regarding the determined reduction seam to the maximum energy value insertion unit 155.

The maximum energy value insertion unit 155 inserts the maximum energy value into the energies of the pixels belonging to the reduction seam among the energies of the pixels of the reduced energy maps stored in the reduced image energy map buffer 151 to update the energy. That is, energy is expressed by a finite numerical value, but is rarely expressed by the maximum value. In effect, since the energy expresses the fact that the pixel is selected as a pixel forming the reduction seam, the maximum energy value different from the actual value is inserted.

Next, the configuration of the partial image search unit 132 will be described. The partial image search unit 132 includes an input image energy map buffer 171, an adjacent energy comparison unit 172, a non-adjacent energy comparison unit 173, a selection path setting unit 174, a selection path storage unit 175, a partial seam determination unit 176, and a partial seam storage unit 177. The partial image search unit 132 also includes a cumulative energy threshold value determination unit 178, an intra-block partial seam number determination unit 179, an output unit 180, and a maximum energy value insertion unit 181.

The input image energy map buffer 171 reads and temporarily stores information regarding the input image energy map stored in the input image energy map storage unit 113. The input image energy map buffer 171 updates and stores the input image energy map in which the maximum energy value is inserted into the energies of the pixels belonging to the calculated partial seam and the values of the energies of the pixels are replaced with the maximum energy value by the maximum energy value insertion unit 181.

The adjacent energy comparison unit 172 sequentially sets the pixels of interest from the pixel located at one end, among the pixels of the input image which belong to the block at the one end, in the block forming the reduction seam supplied from the entire image search unit 131. Then, the adjacent energy comparison unit 172 compares the maximum energy value to the energies of the pixels adjacent to the sequentially set pixels of interest in the search direction, and determines whether all of the energies of the adjacent pixels are only the maximum energy value. The adjacent energy comparison unit 172 supplies the determination result obtained when all of the energies of the adjacent pixels have the maximum energy value to the non-adjacent energy comparison unit 173 depending on the determination result. The adjacent energy comparison unit 172 supplies the information regarding the adjacent pixels to the selection path setting unit 174, when all of the energies of the pixels adjacent to the pixel of interest are not the maximum energy value.

When all of the pixels adjacent to the pixel of interest are the maximum energy value in the determination result of the adjacent energy comparison unit 172, the non-adjacent energy comparison unit 173 selects, as adjacent pixels, pixels which are not adjacent to the pixel of interest depending on the position of the pixel of interest and supplies the selected adjacent pixels to the selection path setting unit 174. That is, the non-adjacent energy comparison unit 173 selects, as the adjacent pixels, the plurality of pixels which are not adjacent to the pixel of interest but are adjacent to the pixels adjacent to the pixel of interest.

Based on the information regarding the input image map stored in the input image energy map buffer 171 and the information regarding the pixels set as the adjacent pixels supplied from the non-adjacent energy comparison unit 173, the selection path setting unit 174 sets the pixels with the minimum energy sequentially in the selection direction among the pixels adjacent in the direction from one end of the reduction seam to the other end thereof in the pixels of the input image which belong to the reduction seam. The selection path setting unit 174 stores the set pixels with the minimum energy in the selection path storage unit 175.

The partial seam determination unit 176 determines, as a partial seam, the path along which the cumulative energy of the pixels stored in the selection path storage unit 175 and present in the selection direction is the minimum, from the respective pixels, which are stored in the selection path storage unit 175, belonging to the reduction seam and being present at one end of the input image. The partial seam determination unit 176 stores information regarding the determined partial seam in the partial seam storage unit 177.

The cumulative energy threshold value determination unit 178 determines whether the cumulative energy of the recently generated partial seam stored in the partial seam storage unit 177 is smaller than a predetermined threshold value. The cumulative energy threshold value determination unit 178 notifies the maximum energy value insertion unit 181 of the result, when the cumulative energy of the recently generated partial seam is smaller than the predetermined threshold value. The cumulative energy threshold value determination unit 178 inserts and updates the maximum energy value into the energies of the pixels belonging to the partial seam recently stored in the input image energy map and simultaneously searches a new partial seam.

On the other hand, when the cumulative energy of the recently generated partial seam is not smaller than the predetermined threshold value, the cumulative energy threshold value determination unit 178 notifies the output unit 180 of the result and outputs the information regarding the partial seam stored in the partial seam storage unit 177 from the output unit 180 to the processing unit 116.

The intra-block partial seam number determination unit 179 determines whether the number of current partial seams is a number set in advance by the reduction block unit formed from the pixels of the reduced image in which the reduction seam is calculated. When the number of current partial seams is the number set in advance, the intra-block partial seam number determination unit 179 notifies the entire image search unit 131 that a new reduction seam is searched.

Image Size Changing Process

Figure 6:
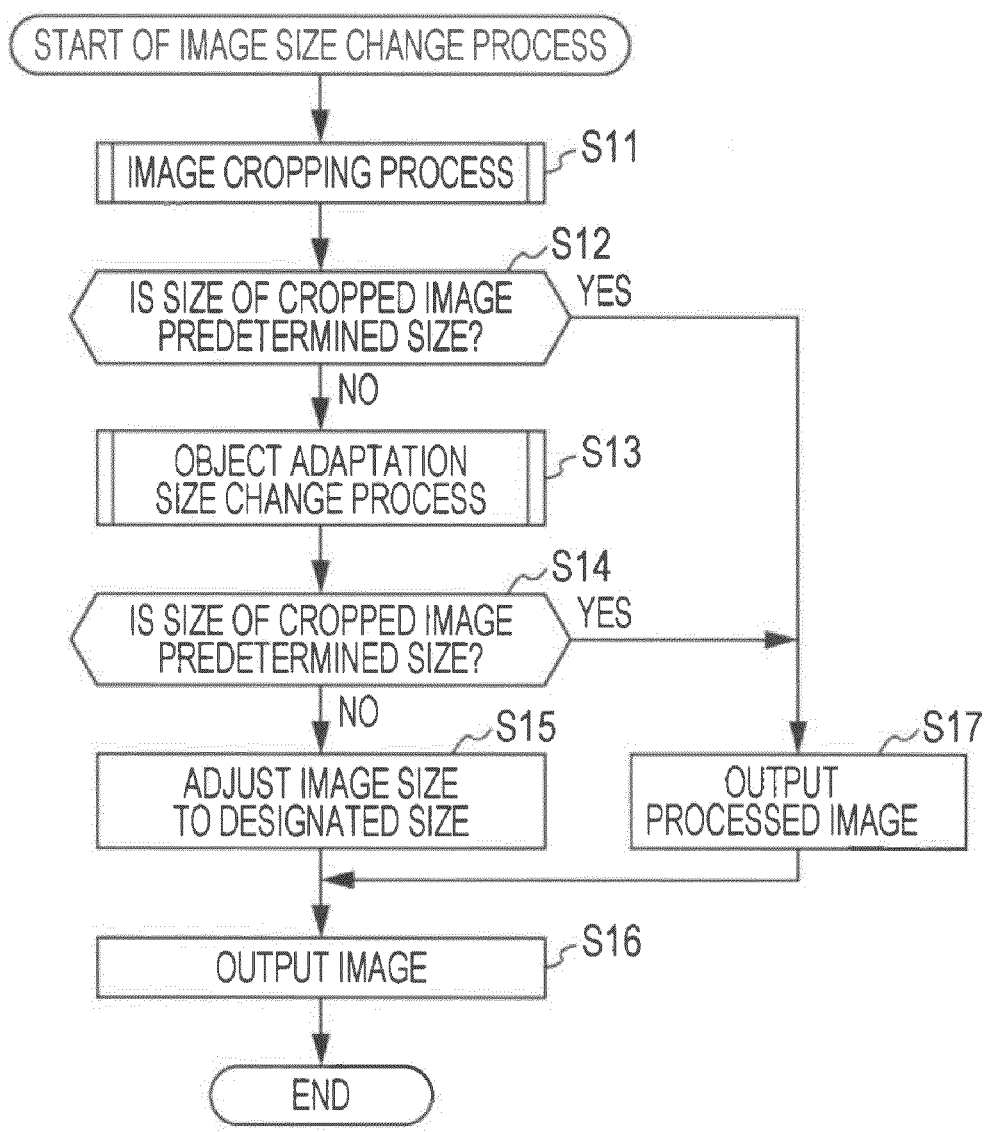
FIG. 6 is a flowchart illustrating an image size changing process.

Next, an image size changing process will be described with reference to the flowchart of FIG. 6.

Figure 7:
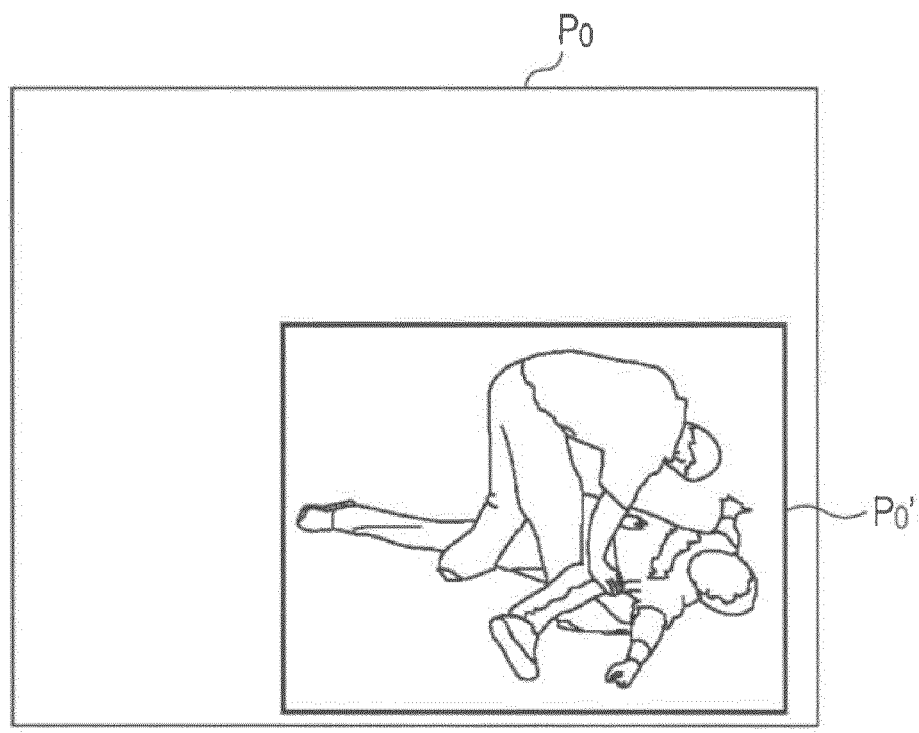
FIG. 7 is a diagram illustrating the image size changing process.

In step S11, the image cropping unit 21 performs the image cropping process of cutting a crop image P0' formed from a region including a subject from an input image P0 shown in FIG. 7, for example. Then, the image cropping unit 21 outputs the cut crop image P0' to the object adaptation size changing unit 22 and the crop size determination unit 23. The image cropping process will be described in detail below with reference to the flowchart of FIG. 8.

In step S12, the crop size determination unit 23 determines whether the reduced size of the crop image supplied from the image cropping unit 21 is suitable to be displayed on the display unit 12. When the crop size determination unit 23 determines that the reduced size of the crop image is unsuitable to be displayed on the display unit 12 in step S12, the process proceeds to step S13.

In step S13, the crop size determination unit 23 controls the object adaptation size changing unit 22 to perform the object adaptation size changing process of reducing the crop image based on arrangement of a subject which is an object in the crop image. That is, the object adaptation size changing unit 22 reduces the size of the image without changing the size of the object which is the subject in the crop image. Then, the object adaptation size changing unit 22 supplies the reduced crop image to the image size adjustment unit 24 and the changed-image size determination unit 25. The object adaptation size changing process will be described in detail below with reference to the flowchart of FIG. 13.

In step S14, the changed-image size determination unit 25 determines whether the size of the crop image reduced by the object adaptation size changing unit 22 is suitable to be displayed on the display unit 12. When the changed-image size determination unit 25 determines that the size of the reduced crop image is unsuitable in step S14, the process proceeds to step S15.

In step S15, the changed-image size determination unit 25 controls the image size adjustment unit 24 to adjust the reduced crop image so as to have a size suitable to be displayed on the display unit 12 by reducing the crop image in horizontal and vertical directions, as in an example according to the related art, and then outputs the adjusted crop image to the output unit 26.

In step S16, the output unit 26 outputs the reduced image to the display unit 12 to display the reduced image.

On the other hand, when the size of the crop image is suitable to be displayed on the display unit 12 in step S12, the crop size determination unit 23 outputs the supplied crop image to the output unit 26 without change in step S17. In addition, when the size of the subject is not changed according to the position of the subject in the crop image and the image with the changed size is reduced to the suitable size to be displayed on the display unit 12 by the object adaptation size changing unit 22 in step S14, the process proceeds to step S17. That is, the crop image or the reduced crop image is output to the output unit 26 and is displayed on the display unit 12.

That is, in principle, when the crop image is obtained as an image output to the display unit 12 and the crop image is unsuitable for the display unit 12, the object adaptation size changing unit 22 reduces the size of the crop image without changing the size of the object. In addition, when the crop image reduced without changing the size of the object is unsuitable for the display unit 12, the crop image is reduced using a method according to the related art.

That is, the image of which the size is changed is first selected as a candidate of an image to be displayed on the display unit 12 without changing the size of the object in either the crop image or the reduced crop image. Thus, the image in which the size of the object as a subject is reduced as little as possible is first selected as the candidate of an image to be displayed on the display unit 12. Although the image may not be displayed, the image is reduced by the method according to the related art. Therefore, the image is reliably displayed so as to be suitable for the size of the display unit 12.

As a consequence, an image in which an object as a subject is reduced as little as possible is easily displayed on the display unit 12.

Image Cropping Process

Figure 8:
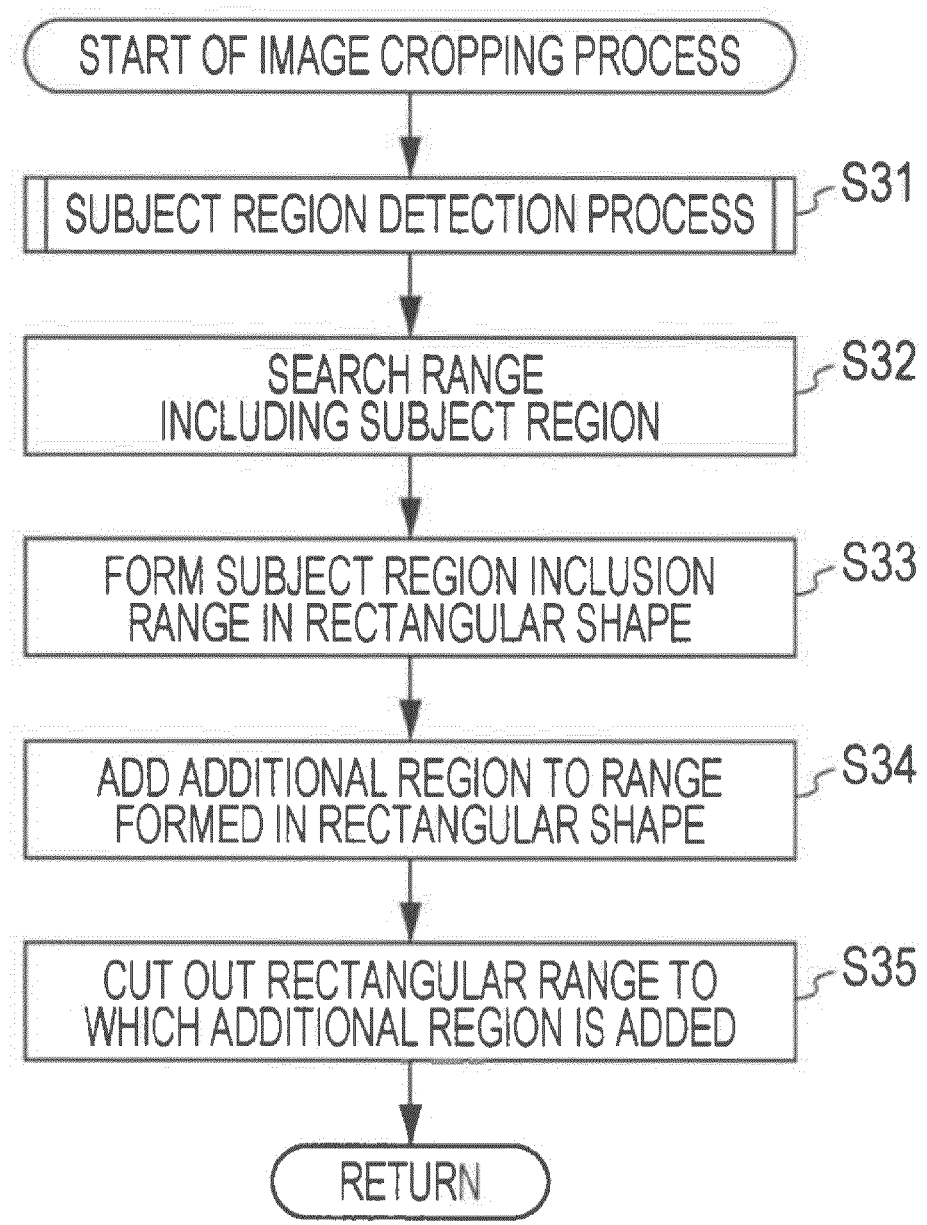
FIG. 8 is a flowchart illustrating an image cropping process.

Next, the image cropping process will be described with reference to the flowchart of FIG. 8.

In step S31, the subject region detection unit 41 performs the subject region detection process of detecting a region where there is an object as a subject from the input image, and supplies the detected region to the subject region inclusion range search unit 42.

Subject Region Detection Process

Figure 9:
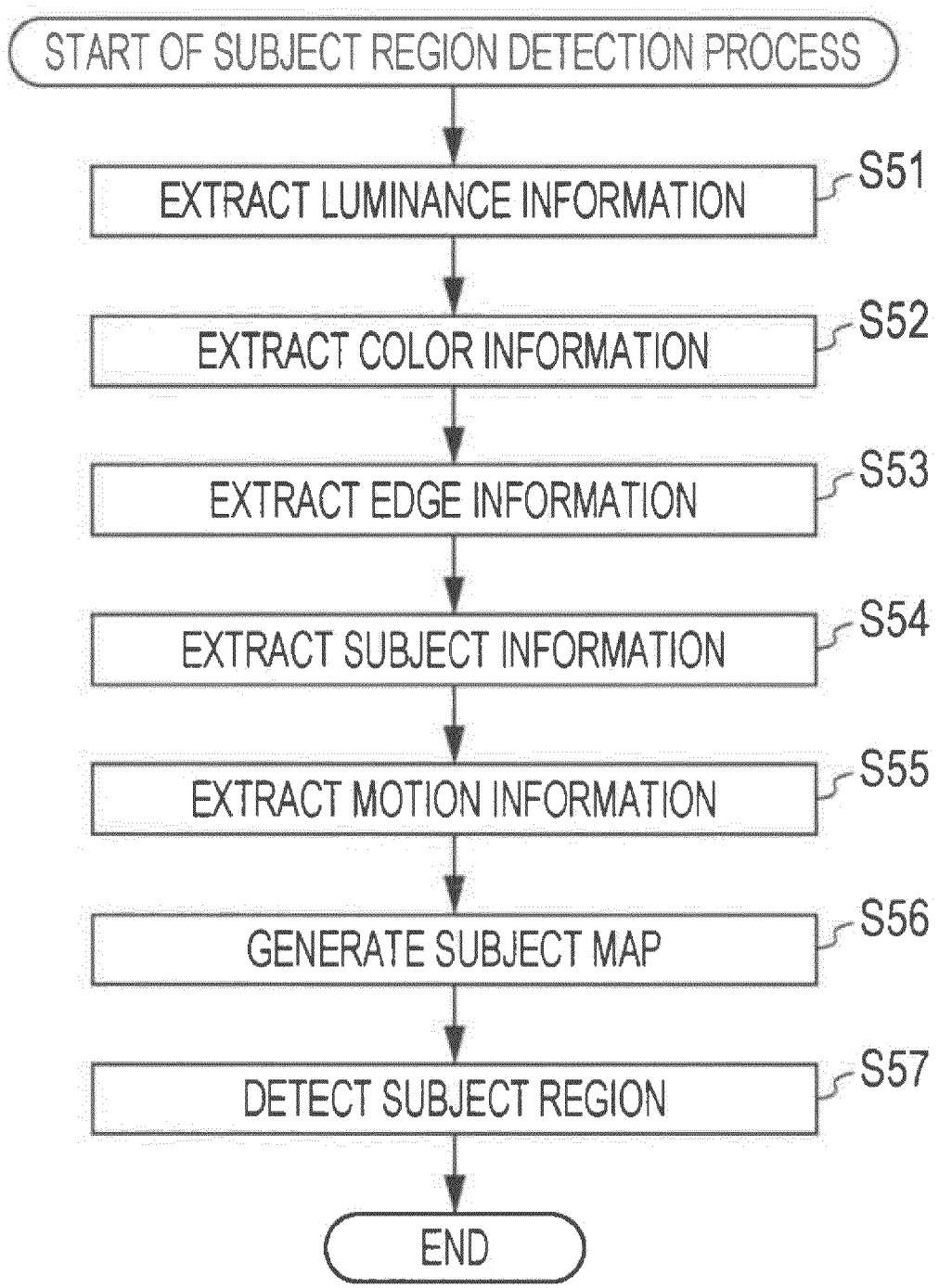
FIG. 9 is a flowchart illustrating a subject region detection process.

Hereinafter, the subject region detection process will be described with reference to the flowchart of FIG. 9.

In step S51, the luminance information extraction unit 61 generates the luminance information map based on the supplied input image and supplies the luminance information map to the subject map generation unit 66. In step S52, the color information extraction unit 62 generates the color information map based on the supplied input image and supplies the color information map to the subject map generation unit 66.

In step S53, the edge information extraction unit 63 generates the edge information map based on the supplied input image and supplies the edge information map to the subject map generation unit 66. In step S54, the subject information extraction unit 64 generates the subject information map based on the supplied input image and supplies the subject information map to the subject map generation unit 66. In step S55, the motion information extraction unit 65 performs a motion information extraction process of generating the motion information map based on the supplied input image and supplies the motion information map to the subject map generation unit 66.

In step S56, the subject map generation unit 66 generates the subject map by weight-adding to the luminance information map supplied from the luminance information extraction unit 61 to the motion information map supplied from the motion information extraction unit 65, and supplies the subject map to the subject region designation unit 67.

For example, the subject map generation unit 66 performs linear combination on each information map using an information weight Wb which is a weight calculated in advance for each information map. That is, on the assumption that predetermined pixels of the information map obtained by the linear combination are pixels of interest, the pixel values of the pixels of interest are a total sum of the values obtained by multiplying the pixel values of the pixels of each information map which are located at the same positions as those of the pixels of interest by the information weight Wb of each information map.

Next, the subject map generation unit 66 performs calculation processing on the pixel values of the respective pixels of the information map (hereinafter, also referred to as a linear combination information map) obtained through the linear combination using the sigmoid function.

More specifically, the subject map generation unit 66 beforehand maintains a conversion table obtainable by making the sigmoid function a table. The conversion table contains predetermined values as input and output values obtained by substituting the predetermined values into the sigmoid function. When the linear combination information map is converted using the conversion table, it is possible to obtain the same information map as that when the linear combination information map is converted using the sigmoid function.

For example, the sigmoid function is a hyperbolic cosine function (hyperbolic tangent function) shown in Expression (3) below.

$$f(x) = a \times \tan h(x \times b) \qquad (3)$$

In Expression (3), a and b are predetermined integers and x is a pixel value of a pixel of the linear combination information map to be converted from the present.

When the hyperbolic cosine function is the sigmoid function, the conversion table is a table obtained by restricting the range of the input value x to −2 to 2 and discretizing the input value x by $1/128$ unit. In the conversion table, when the input value x is smaller than −2, the input value x is considered to be −2. When the input value x is larger than 2, the input value x is considered to be 2. In the conversion table, an output value f(x) increases as the input value x increases.

The subject map generation unit 66 changes the linear combination information map by changing the pixel values of the pixels of the linear combination information map to the output values f(x) corresponding to the pixel values x from the pixel values x (input values x). That is, the subject map generation unit 66 changes the linear combination information map to the linear combination information map subjected to calculation processing by the sigmoid function using the conversion table.

Thus, by converting the linear combination information map using the conversion table, the conversion of the linear combination information map can be performed more simply and quickly compared to a case where the conversion is performed using the sigmoid function itself.

The subject map generation unit 66 forms the subject map by multiplying the pixel value of each pixel of the linear combination information map converted using the conversion table by the subject weight Wc which is a weight calculated in advance for each pixel.

That is, when a pixel targeted in the subject map to be calculated from the present is set as a pixel of interest, a value obtained by multiplying the pixel value of a pixel at the same position as that of the pixel of interest in the converted linear combination information map by the subject weight Wc is considered to be a pixel value of the pixel of interest.

More specifically, the Cr color information map and the Cb color information map as the color information maps used to generate the subject map are used, and the edge information maps in directions of 0 degree, 45 degrees, 90 degrees, and 135 degrees are used as the edge information maps. The information weight Wb and the subject weight Wc are calculated in advance by learning.

When the subject map is generated in this way, the subject map is supplied from the subject map generation unit 66 to the subject region designation unit 67 and the process proceeds to step S57.

In step S57, the subject region designation unit 67 designates the region of a subject on the supplied input image using the subject map supplied from the subject map generation unit 66.

For example, as the pixel values of the pixels of the subject map are larger, the region of the pixels of the input image at the same positions as the pixels are likely to be the region of the subject. In this case, the subject region designation unit 67 detects a region which is formed from pixels having a pixel value equal to or larger than a predetermined threshold value and being adjacent to each other on the subject map and has an area equal to or larger than a predetermined area (pixel number) and sets a region corresponding to the detected region on the input image as a region where a subject is included.

When the subject region designation unit 67 detects the region where the subject is included on the input image, the subject region designation unit 67 outputs the detection result to the rear stage and ends the subject region designation process.

Thus, the subject map is generated from the input image, and the region of the subject in the input image is designated using the subject map.

Hereinafter, referring back to the flowchart of FIG. 8, the description will be made.

Figure 10:
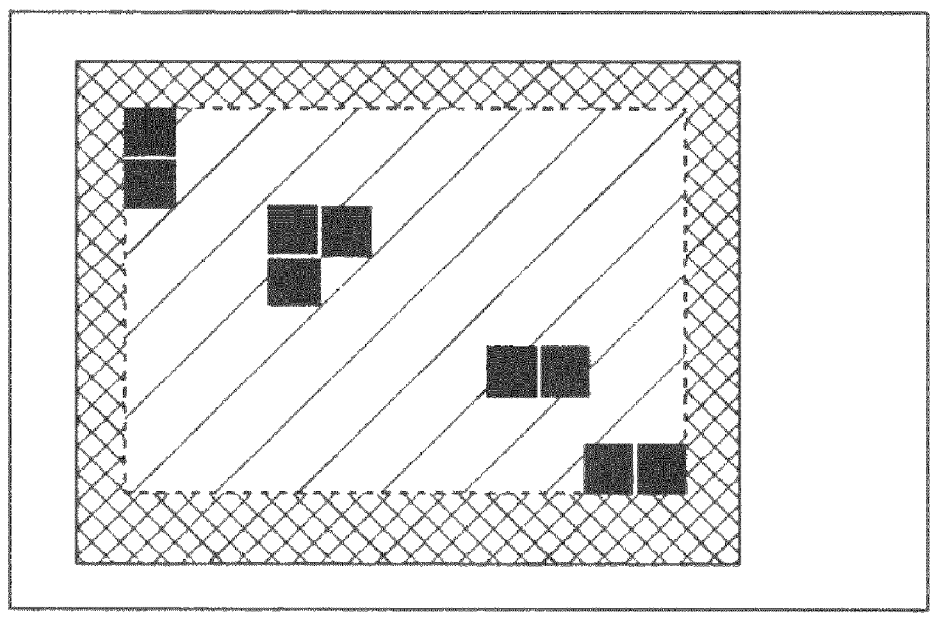
FIG. 10 is a diagram illustrating the subject region detection process.

In step S32, the subject region inclusion range search unit 42 searches the range including the subject region and supplies the search result to the subject region inclusion rectangular range formation unit 43. That is, for example, as shown in FIG. 10, when the regions of subjects are detected in the input image, as indicated by black masses, the subject region inclusion range search unit 42 searches a range including all of the regions of the subjects indicated by the black masses, as indicated by diagonal lines.

In step S33, the subject region inclusion rectangular range formation unit 43 generates a rectangular image by forming the rectangular range including all of the regions of the subjects searched by the subject region inclusion range search unit 42, and supplies the rectangular image to the additional region addition unit 44.

In step S34, the additional region additional unit 44 adds an additional region with a predetermined width to the outer circumference of a subject region inclusion range formed with a rectangular shape, and supplies the additional region to the image cutout unit 45. That is, for example, when the subject region inclusion range is a range indicated by the diagonal lines in FIG. 10, the additional region additional unit 44 adds the additional region with the predetermined width, as indicated by a lattice portion in FIG. 10, to the outer circumference of the subject region inclusion range. The predetermined width may be determined based on a reduction ratio of the input image, when the subject map is calculated.

In step S35, the image cutout unit 45 cuts the subject region inclusion range and the region formed by the additional region from the input image to generate the crop image, and outputs the crop image. That is, the image cutout unit 45 generates the crop image by cutting the subject region inclusion range surrounded by the lattice portion and the range formed by the additional region from the input image indicated by a solid line of the outermost circumference in FIG. 10.

By the above process, the region of a subject shown in the lower part of FIG. 11 is detected in the input image in which a person rides a bicycle, as shown in the upper part of FIG. 11. That is, since the bicycle and the person are recognized as objects which are subjects in the upper part of FIG. 11, the region of the subject as the person is detected near the middle portion of the image. In the method according to the related art, the marginal portion of the person which is the subject may be cut, when only a region having the pixel value indicating the region of a subject is cut from the input image using the region of the subject shown in the lower part of FIG. 11. That is, for example, as shown in the upper part of FIG. 12, a part of the head of the person which is the subject may be cut.

However, by adding the additional region with the predetermined width to the subject region inclusion range, the part or the like of the head of the person which is the subject is reliably cut, as shown in the lower part of FIG. 12.

That is, a part of the marginal portion of a subject may not be reliably detected even in the subject detection process. Therefore, by adding the additional region to cover the range, the subject can be reliably cut.

Object Adaptation Size Changing Process

Figure 13:
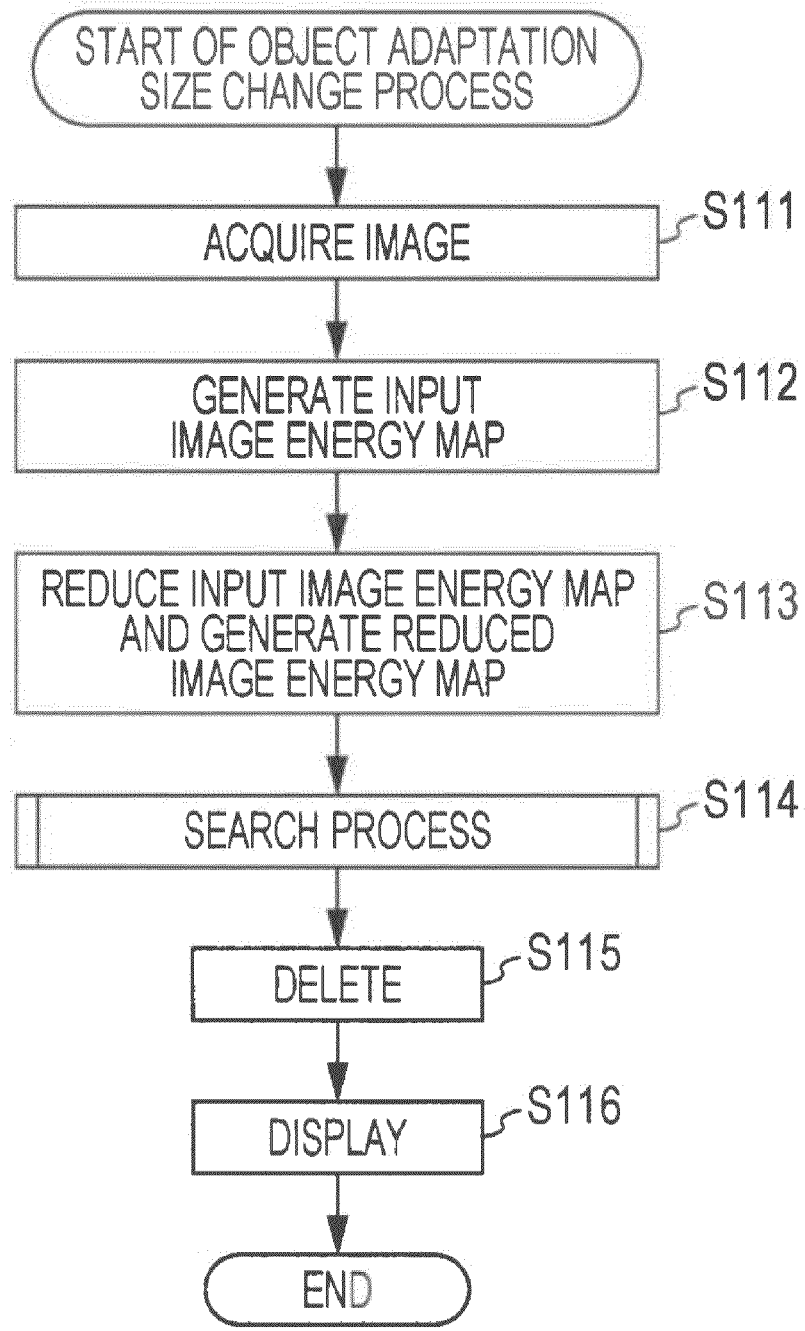
FIG. 13 is a flowchart illustrating an object adaptation size changing process.

Next, an object adaptation size changing process will be described with reference to the flowchart of FIG. 13.

In step S111, the image acquisition unit 111 acquires the input image and supplies the acquired input image to the energy map generation unit 112 and the processing unit 116.

In step S112, the energy map generation unit 112 controls the energy calculation unit 121 to calculate the energy of each pixel by calculating Expression (1) described above based on the pixel value, the luminance value, or the like of each pixel of the input image. Moreover, the energy map generation unit 112 controls the energy calculation unit 121 to generate the input image energy map from the values of the energies calculated by each pixel unit. Then, the energy map generation unit 112 stores the input image energy map in the input image energy map storage unit 113 and supplies the input image energy map to the reduction unit 122.

In step S113, the energy map generation unit 112 generates the reduced image energy map by controlling the reduction unit 122 and processing the energy map so as to have the size of the reduced image, and stores the reduced image energy map in the reduced image energy map storage unit 114. More specifically, the reduction unit 122 forms the input image energy map into a block, for example, by a unit of m by n pixels and generates the reduced image energy map in which the average value, the intermediate value, or the like of the energies of the pixels forming each block is set as the energy corresponding to each pixel of the reduced image. In this example, the energy map corresponding to the reduced image is called the reduced image energy map. In effect, however, the reduced image energy map is the same as the energy map formed so that the input image energy map has a low resolution.

In step S114, the search unit 115 searches the predetermined number of partial seams by performing the search process based on the input image energy map of the input image energy map storage unit 113 and the reduced image energy map of the reduced image energy map storage unit 114. That is, the search unit 115 searches, as the predetermined number of partial seams, the paths along which a variation in the pixel value or the luminance value is small among the paths formed by the pixels adjacent in the horizontal direction (x direction) or the vertical direction (y direction) of the input image. Then, the search unit 115 supplies information regarding the predetermined number of partial seams to the processing unit 116. The search process will be described below with reference to the flowchart of FIG. 14.

In step S115, the processing unit 116 reduces the image by deleting the pixels forming the partial seam from the input image and filling the deleted region based on the information regarding the partial seam.

In step S116, the processing unit 116 outputs and displays the image obtained by processing the input image on the display unit 2.

The partial seams formed by the adjacent pixels in which a variation in the pixel value or the luminance value between the pixels is small (the cumulative energy which is the cumulative value of the energies is the minimum) are calculated for the input image through the above-described processes. The pixels forming the calculated partial seam are deleted from the input image. Thus, since the process of reducing the input image is realized in this way, the entire size of the input image can be varied without changing the size of a main object in the image. The seam carving according to the related art may be used in the object adaptation size changing process.

Search Process

Figure 14:
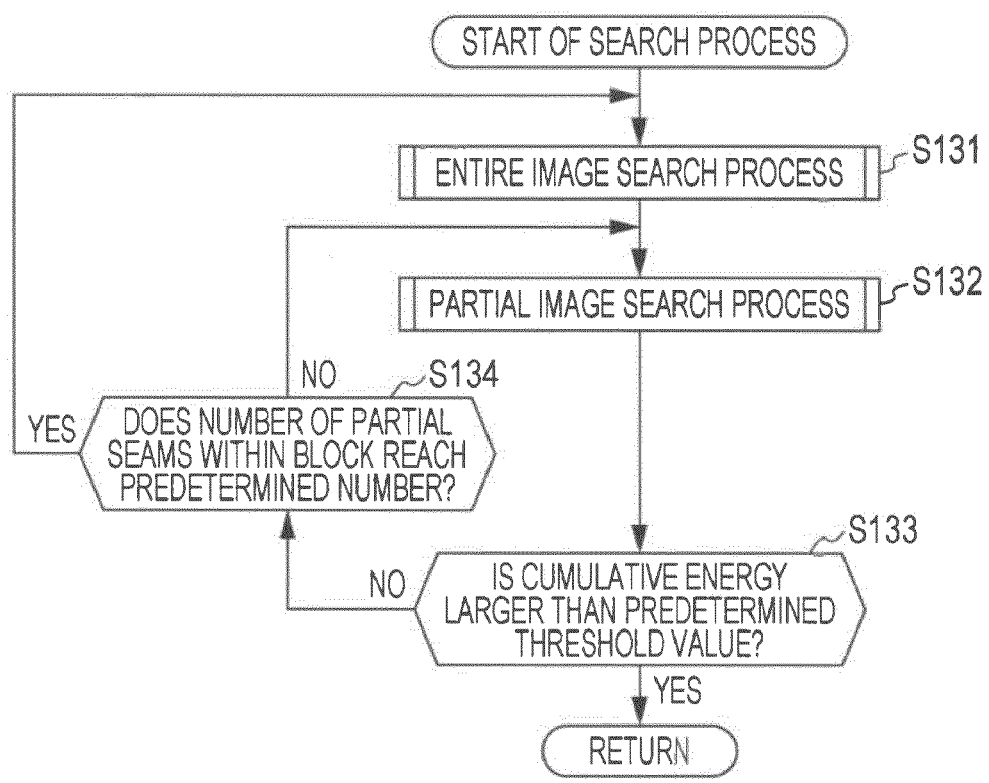
FIG. 14 is a flowchart illustrating a search process.

Next, the search process will be described with reference to the flowchart of FIG. 14.

In the search process, the reduction seam is calculated in the reduced image by performing the entire image search process using the reduced image energy map in step S131. When the reduction seam is calculated, the partial image search process is performed in step S132 based on the reduction seam which is calculated by the entire image search process, so that the partial seam for the input image is calculated.

Entire Image Search Process

Hereinafter, the entire image search process using the reduced image energy map will be described with reference to the flowchart of FIG. 15. Referring to the flowchart of FIG. 15, an example will be described in which the reduction seams sequentially binding the pixels adjacent to the pixels located at the upper end of a rectangular image and adjacent to the pixels located at the lower end thereof is calculated. Such a reduction seam binding the ends in the vertical direction is obtained to reduce the image in the horizontal direction of the reduction image. Therefore, when the image is reduced in the vertical direction of the reduced image, it is necessary to calculate the reduction seams sequentially binding the pixels located at the ends in the horizontal direction, that is, the pixels adjacent to the pixels located at the left end and adjacent to the pixels located at the right end in the same way.

In step S151, the reduced image energy map buffer 151 reads the reduced image energy map from the reduced image energy map storage unit 114 and temporarily stores the reduced image energy map.

In step S152, the cumulative energy map generation unit 152 sets a pixel of interest (x, y) in the reduced image energy map to (0, 1) for initialization. The coordinates set herein are determined on the assumption that the pixel located at the upper left end of a reduced image is the origin (0, 0), the rightward direction is positive for the x coordinate in the horizontal direction, and the downward direction is positive for the y coordinate in the vertical direction.

In step S153, the cumulative energy map generation unit 152 determines whether the y coordinate of the pixel of interest (x, y) is smaller than the height of the reduced image in the vertical direction. In the initial process, for example, in step S153, the y coordinate has no height in the vertical direction of the reduced image, and thus the process proceeds to step S154.

In step S154, the cumulative energy map generation unit 152 determines whether the x coordinate of the pixel of interest (x, y) is smaller than the width of the reduced image in the horizontal direction. When the x coordinate of the pixel of interest (x, y) is smaller than the width of the reduced image in the horizontal direction in step S154, the process proceeds to step S155.

In step S155, the cumulative energy map generation unit 152 selects the pixel having the minimum cumulative energy among the energies of the pixel (x−1, y+1) located left above, the pixel (x, y+1) located immediately above, and the pixel (x+1, y+1) located right above the pixel of interest (x, y) in the reduced image energy map. The cumulative energy map generation unit 152 adds the cumulative energy of the selected pixel to the energy of the pixel of interest to calculate the cumulative energy of the pixel of interest.

In step S156, the cumulative energy map generation unit 152 stores the calculated cumulative energy as the cumulative energy of the pixel of interest in the cumulative energy map storage unit 153. When the pixel of interest is located below by one pixel from the upper end, the energy of the pixel located at the upper end is used as the cumulative energy.

In step S157, the cumulative energy map generation unit 152 increases the x coordinate of the pixel of interest (x, y) by one, and then the process returns to step S154. When the x coordinate of the pixel of interest (x, y) is not smaller than the width of the reduced image in the horizontal direction in step S154, that is, when all the processes end in the horizontal direction, the process proceeds to step S158.

In step S158, the cumulative energy map generation unit 152 increases the y coordinate of the pixel of interest (x, y) by one, the process returns to step S153. That is, by repeating the processes from step S153 to step S158, the pixel having the minimum cumulative energy is selected among the cumulative energies of three pixels adjacent to each pixel of the reduced image in a direction reverse to the search direction. Then, the selected cumulative energy is sequentially added to the energies of the respective pixels, and the cumulative energy maps are generated and stored in the cumulative energy map storage unit 153.

Figure 16:
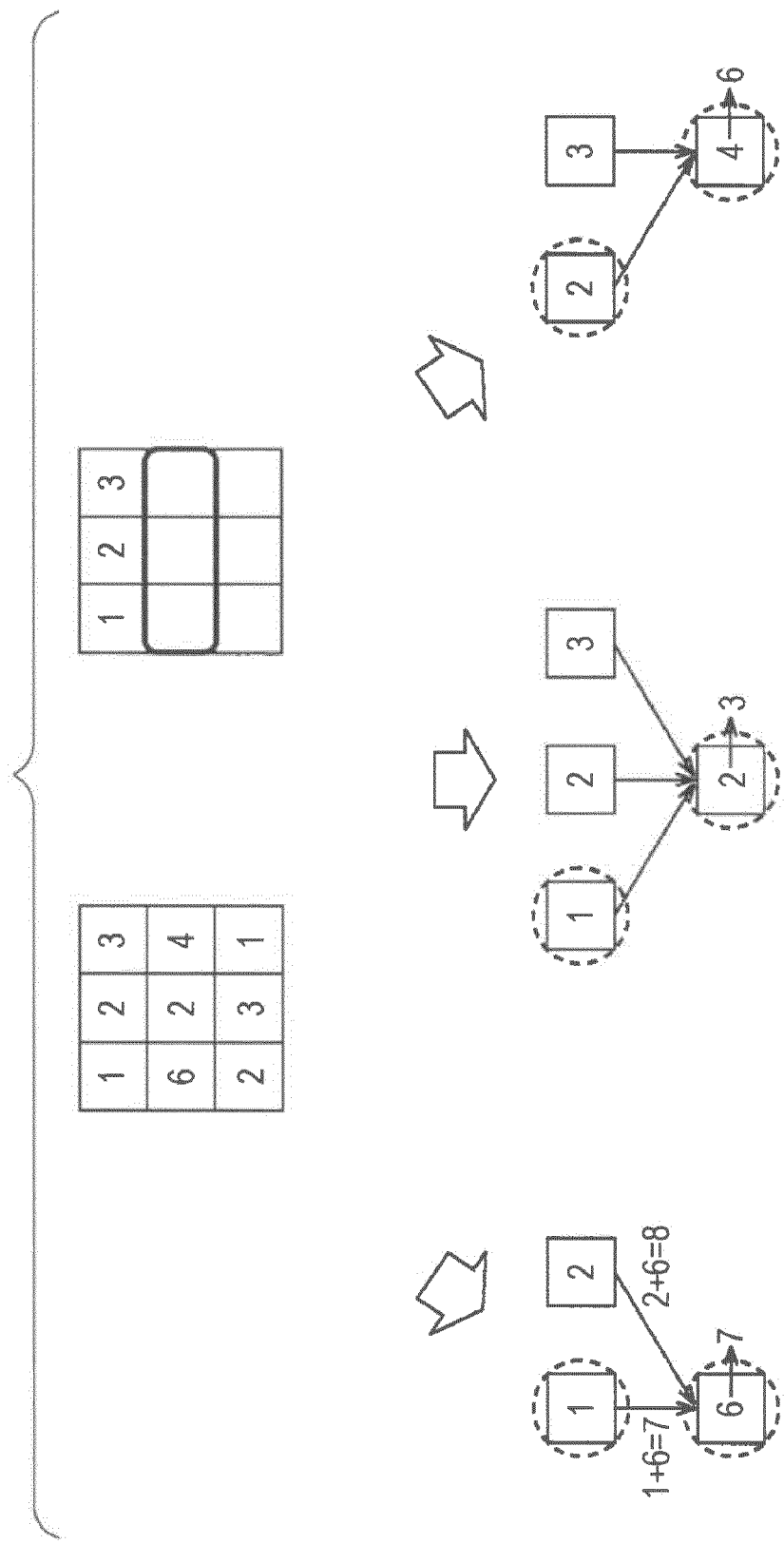
FIG. 16 is a diagram illustrating the process of searching the entire image.

More specifically, on the assumption that the reduced image energy map of 3 by 3 pixels located at the left upper part in FIG. 16 is used, the following process is performed. The energies of the reduced image energy map at the left upper part in FIG. 16 are 1, 2, and 3 from the left side to the right side in the upper stage, are 6, 2, and 4 from the left side to the right side in the middle stage, and are 2, 3, and 1 from the left side to the right side in the lower stage.

The initial pixel of interest (x, y) is a pixel (0, 1) with energy 6 in the process of step S152. Since the pixel of interest (0, 1) is a pixel located at the left end, the pixel (0, 0) with the minimum cumulative energy is selected among two pixels: a pixel (0, 0) with energy 1 located immediately above the pixel of interest and a pixel (1, 0) with energy 2 located right above the pixel of interest by the process of step S155. As shown in the left lower part of FIG. 16, the cumulative energy map generation unit 152 stores a cumulative value 7 of energy 1 (which is treated as cumulative energy herein) of the selected pixel (0, 0) and energy 6 of the pixel of interest (x, y), as the cumulative energy of the pixel of interest (x, y)=(0, 1) of the cumulative energy map in the cumulative energy map storage unit 153.

In the process of step S157, the x coordinate of the pixel of interest (x, y) is increased by one, and thus the energy of the pixel of interest (x, y) becomes energy 2 of a pixel (1, 1). In the process of step S155, as for the pixel of interest (1. 1), the pixel (0, 0) with the minimum cumulative energy is selected among three pixels: the pixel (0, 0) with energy 1 located left above the pixel of interest (1, 1), the pixel (1, 0) with energy 2 located immediately above this pixel of interest, and the pixel (2, 0) with energy 3 located right above this pixel of interest. As shown in the lower middle part of FIG. 16, the cumulative energy map generation unit 152 stores a cumulative value 3 of energy 1 of the selected pixel (0, 0) and energy 2 of the pixel of interest (x, y) as the cumulative energy in the pixel of interest (x, y)=(1, 1) of the cumulative energy map in the cumulative energy map storage unit 153.

In the process of step S157, the x coordinate of the pixel of interest (x, y) is increased by one, and thus the energy of the pixel of interest (x, y) becomes energy 4 of a pixel (2, 1). Since the pixel of interest (2, 1) is a pixel at the right end of the reduced image, the pixel (2, 0) with the minimum energy is selected between two pixels: a pixel (1, 0) with energy 2 located left above the pixel of interest and a pixel (2, 0) with energy 3 located immediately above the pixel of interest by the process of step S155. As shown in the right lower part of FIG. 16, the cumulative energy map generation unit 152 stores a cumulative value 6 of energy 2 of the selected pixel (1, 0) and energy 4 of the pixel of interest (x, y) as the cumulative energy in the pixel of interest (x, y)=(2, 1) of the cumulative energy map in the cumulative energy map storage unit 153.

Figure 17:
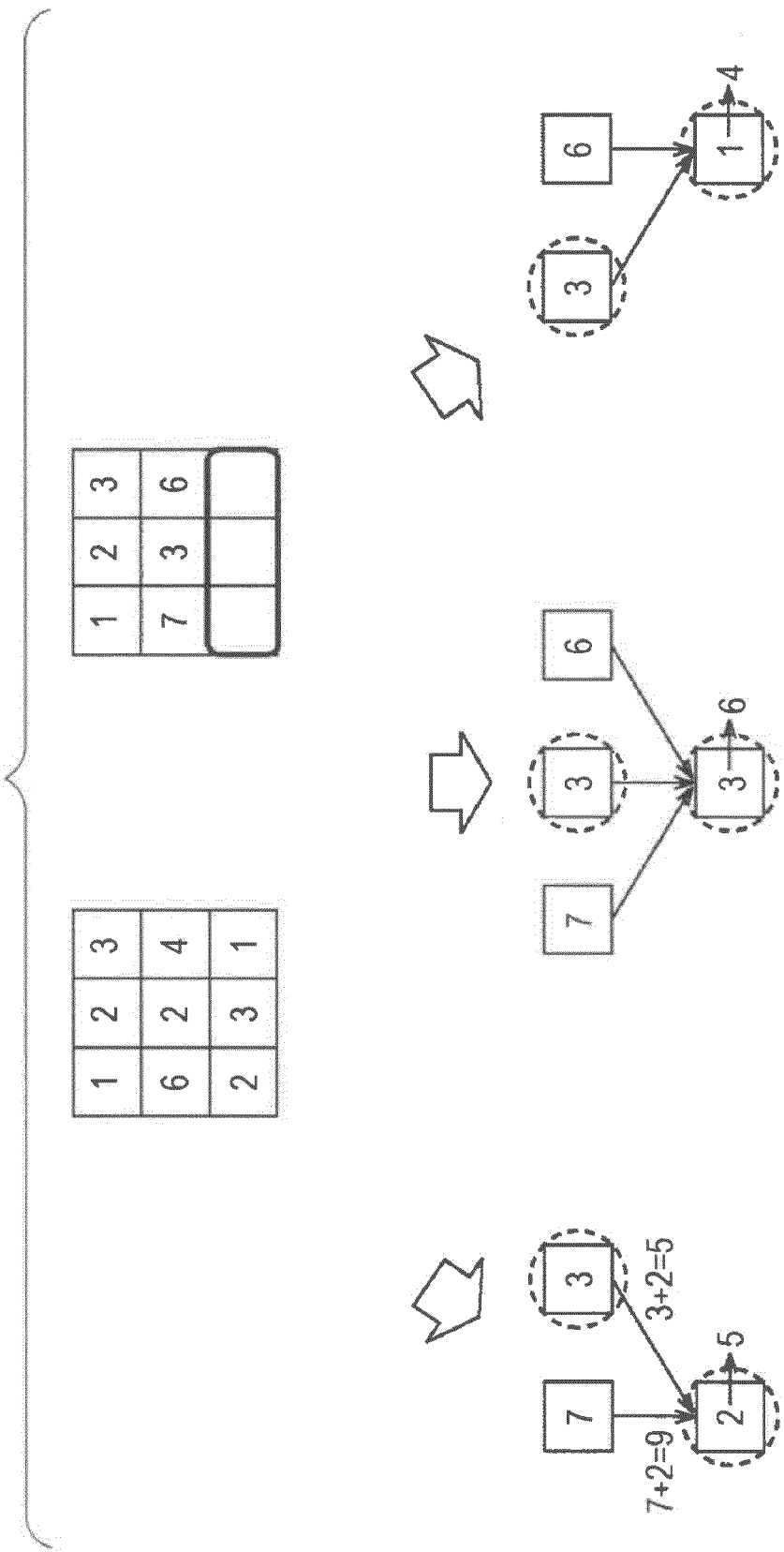
FIG. 17 is a diagram illustrating the process of searching the entire image.

As a consequence, the cumulative energies of the middle stage in the second cumulative energy map are 7, 3, and 6 from the left side, as shown in the right upper part of FIG. 17. At this time, the x coordinate of the pixel of interest (x, y) is not smaller than the width (=2) of the reduced image in the horizontal direction, the respective pixels in the lower stage of the reduced image are sequentially set as the pixel of interest while the y coordinate is increased by one in step S158. The reduced image energy map is shown in the left upper part of FIG. 17.

In the same processes as the above-described processes, the cumulative energy of the pixel (0, 1) located immediately above the pixel of interest is 7 and the pixel (1, 1) located right above the pixel of interest is 3 based on the cumulative energy map, when the pixel of interest (x, y) is a pixel (0, 2). Accordingly, the pixel (1, 1) with the minimum cumulative energy 3 located right above the pixel of interest is selected. Then, cumulative energy 3 and energy 2 of the pixel of interest (x, y)=(0, 2) are cumulatively added, so that the cumulative energy of the pixel of interest (x, y)=(0, 2) becomes 5 and is registered in the cumulative energy map.

Moreover, when the pixel of interest (x, y) is a pixel (1, 2), the cumulative energy of the pixel (0, 1) located left above the pixel of interest is 7, the cumulative energy of the pixel (1, 1) located immediately above the pixel of interest is 3, and the cumulative energy of the pixel (2, 1) located right above the pixel of interest is 6, based on the cumulative energy map. Accordingly, the pixel (1, 1) with the minimum cumulative energy 3 located immediately above the pixel of interest is selected. Then, cumulative energy 3 and energy 3 of the pixel of interest (x, y)=(1, 2) are cumulatively added, so that the cumulative energy of the pixel of interest (x, y)=(1, 2) becomes 6 and is registered in the cumulative energy map.

Furthermore, when the pixel of interest (x, y) is a pixel (2, 2), the cumulative energy of the pixel (1, 1) located left above the pixel of interest is 3 and the cumulative energy of the pixel (2, 1) located immediately above the pixel of interest is 6, based on the cumulative energy map. Accordingly, the pixel (1, 1) with the minimum cumulative energy 3 located left above the pixel of interest is selected. Then, cumulative energy 3 and energy 1 of the pixel of interest (x, y)=(2, 2) are cumulatively added, so that the cumulative energy of the pixel of interest (x, y)=(2, 2) becomes 4 and is registered in the cumulative energy map.

As a consequence, the cumulative energy map is constructed, as shown in the right upper part of FIG. 18 and the cumulative energies in the lower stage are 5, 6, and 4 from the left side. In the left upper part of FIG. 18, the reduced image energy map is shown.

Thus, for example, when the reduced image energy map shown in the left upper part of FIG. 18 is obtained by repeating the processes from step S153 to step S158, the cumulative energy map shown in the right upper part of FIG. 18 is calculated and is stored in the cumulative energy map storage unit 153.

Then, referring back to the flowchart of FIG. 15, the description will be made.

When it is determined that the y coordinate of the pixel of interest (x, y) is not smaller than the height of the reduced image in the vertical direction in step S153, that is, when the cumulative energy map is completed, as described above, and is considered to be stored in the cumulative energy map storage unit 153, the process proceeds to step S159.

In step S159, the reduction seam determination unit 154 reads the cumulative energy map stored in the cumulative energy map storage unit 153, searches the pixel with the minimum cumulative energy at the lowermost stage, and sets the end of the reduction seam as the lower end. The reduction seam determination unit 154 repeatedly searches the pixels sequentially from the pixel located at the lower end of the reduction seam to the pixel located at the upper end thereof among the pixels adjacent upward to the pixels of interest, that is, the pixels adjacent right above, immediately above, and left above the pixels of interest. Then, the reduction seam determination unit 154 determines the path binding the sequentially searched pixels as the reduction seam, supplies the information regarding the reduction seam to both the partial image search unit 132 and the maximum energy value insertion unit 155.

That is, in the case of the cumulative energy map shown in the right upper part of FIG. 18, the minimum value of the cumulative energy at the lowermost stage is 4 indicated by a circle in FIG. 18 and a pixel (2, 2) has energy 1. That is, the pixel (2, 2) is located at the lower end of the reduction seam. The minimum cumulative energy is 3 between the energies of the pixel (2, 1) and the pixel (1, 1) adjacent upward to the pixel (2, 2), and the pixel (1, 1) has energy 2. Moreover, the minimum cumulative energy is 1 among the energies of the pixel (0, 0), the pixel (1, 0) and the pixel (2, 0) adjacent upward to the pixel (1, 1), and the pixel (0, 0) has energy 1.

The sequentially cumulated energy becomes the minimum along the path formed by the pixel (2, 2), the pixel (1, 1), and the pixel (0, 0) searched sequentially from the pixel (2, 2) located at the lower end to the pixel (0, 0) located at the upper end. Therefore, the path formed by the pixel (2, 2), the pixel (1, 1), and the pixel (0, 0) becomes a path, along which the variation in the pixel value or the luminance value between the adjacent pixels is the minimum, on the reduced image, that is, becomes the reduction seam. Accordingly, the reduction seam determination unit 154 determines the path formed based on the information regarding the coordinates of the searched pixels as the reduction seam.

In step S160, the maximum energy value insertion unit 155 reads the reduced image energy map stored in the reduced image energy map buffer 151, and inserts and updates the maximum value into the energy of each pixel forming the reduction seam determined by the reduction seam determination unit 154. As a consequence, the pixels with the maximum value can be pixels scarcely selected as the pixels forming the reduction seam in the subsequent process. Consequently, when a plurality of reduction seams are selected, same pixels are prevented from being included in the plurality of reduction seams due to intersection or the like of the reduction seams. Accordingly, when the pixels belonging to the reduction seams are deleted, a pixel difference can be prevented from occurring.

Figure 15:
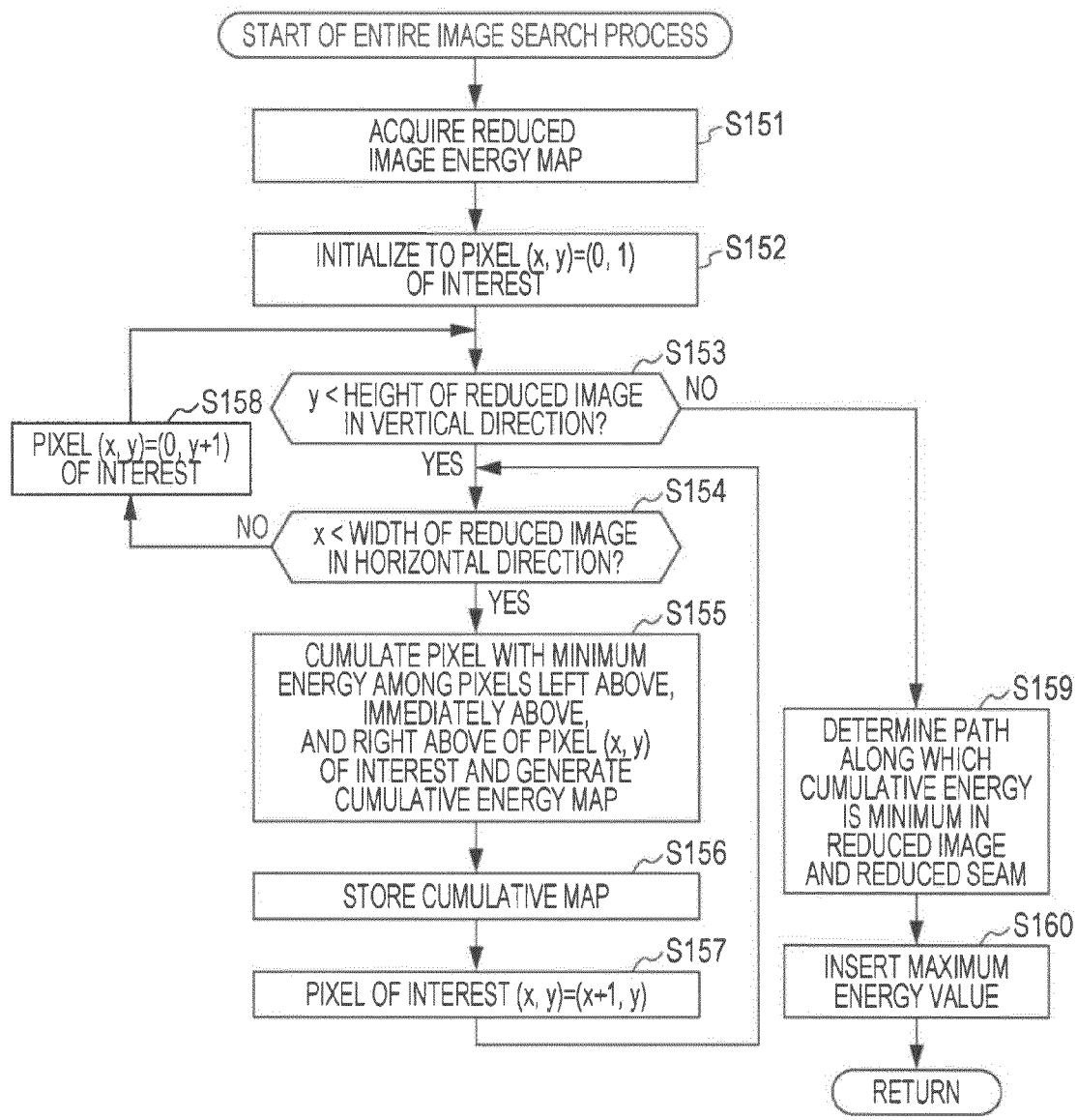
FIG. 15 is a flowchart illustrating a process of searching the entire image.

The method of calculating the reduction seam by the process described with reference to the flowchart of FIG. 15 is generally a method called a dynamic programming method. However, the reduction seam may be calculated by a greedy method described below.

Partial Image Search Process

Figure 19:
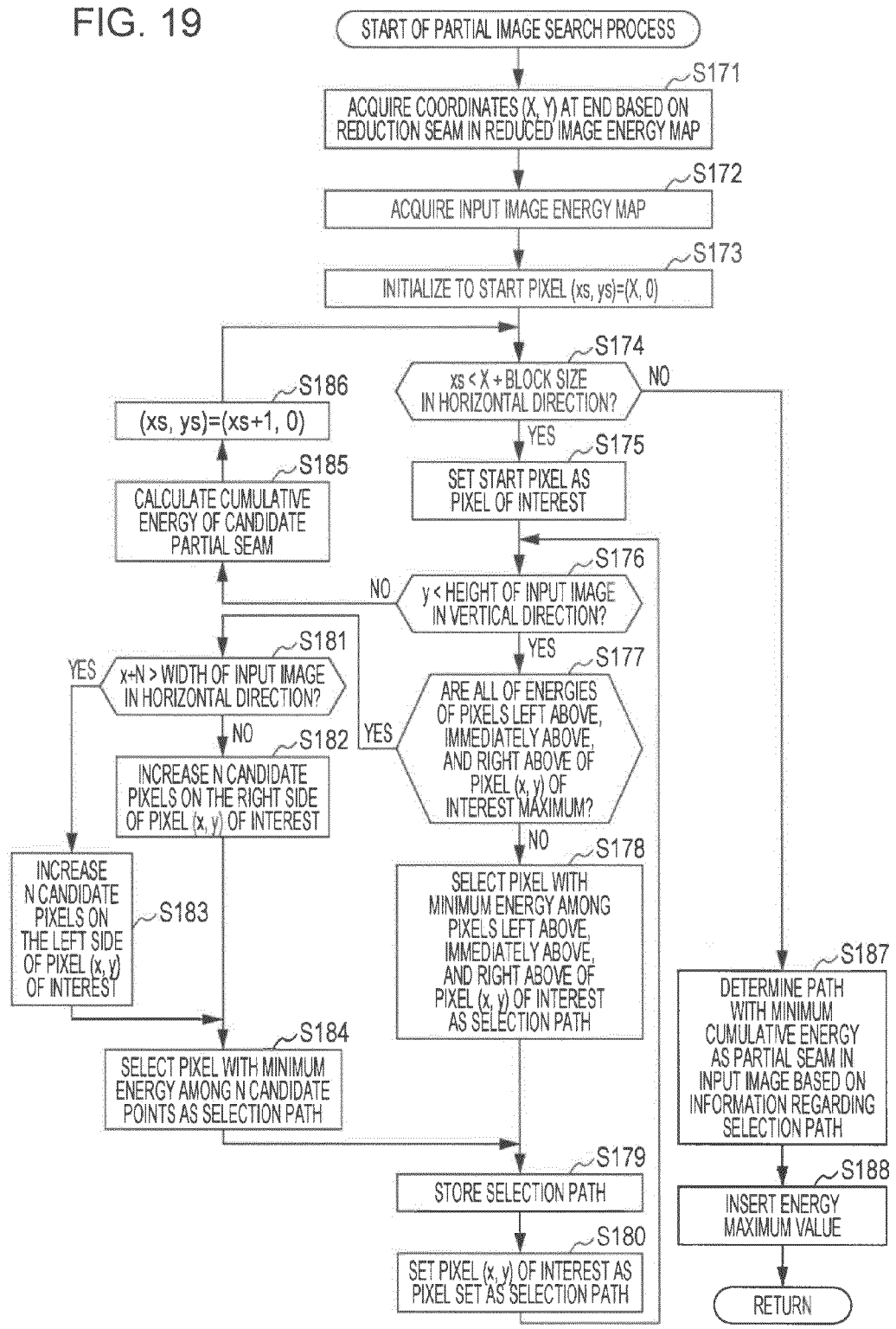
FIG. 19 is a flowchart illustrating a process of searching a partial image.

Next, the partial image search process will be described with reference to the flowchart of FIG. 19.

In step S171, the adjacent energy comparison unit 172 acquires the coordinates of a pixel at the end of the input image based on the reduction seam calculated based on the reduced image energy map by the above-described entire image search process. That is, the reduction seam is obtained based on the reduction image in which the block with a plurality of pixels (for example, m by n pixels) of the input image is set to one pixel, that is, a low-resolution image. Accordingly, the pixels forming the calculated reduction seam on the reduced image correspond to the block with a plurality of pixels in the input image. The adjacent energy comparison unit 172 calculates the coordinates (X, Y) of a pixel (block) forming the reduction seam at one end of the input image in the horizontal direction. For example, the coordinates of the pixel at the other end in the horizontal direction are calculated as (X+m), since the size of the block is known.

In step S172, the input image energy map buffer 171 reads and temporarily stores the input image energy map stored in the input image energy map storage unit 113.

In step S173, the adjacent energy comparison unit 172 sets a start pixel (xs, ys) of a candidate of the partial seam as a pixel (X, 0) based on the coordinates at the end of the reduction seam.

In step S174, the adjacent energy comparison unit 172 determines whether the xs coordinate of the start pixel (xs, ys) is smaller than (X+m) (m: block size in the horizontal direction). For example, when the xs coordinate is smaller than (X+m), the process proceeds to step S175.

In step S175, the adjacent energy comparison unit 172 sets the start pixel (xs, ys) as the pixel of interest (x, Y).

In step S176, the adjacent energy comparison unit 172 determines whether the y coordinate of the pixel of interest (x, y) is smaller than the height of the input image in the vertical direction. For example, when the y coordinate is smaller than the height of the input image in the vertical direction, the process proceeds to step S177.

In step S177, the adjacent energy comparison unit 172 reads the input image energy map from the input image energy map buffer 171 and determines whether all of the energies of a pixel (x−1, y+1) adjacent left below the pixel of interest (x, y), a pixel (x, y+1) adjacent immediately below the pixel of interest (x, y), and a pixel (x+1, y+1) adjacent right below the pixel of interest (x, y) are the maximum energy value. For example, when all of the energies of the pixel (x−1, y+1) adjacent left below the pixel of interest (x, y), the pixel (x, y+1) adjacent immediately below the pixel of interest (x, y), and the pixel (x+1, y+1) adjacent right below the pixel of interest (x, y) are not the maximum energy value, the process proceeds to step S178.

In step S178, the adjacent energy comparison unit 172 notifies the selection path setting unit 174 of information regarding the pixel of interest (x, y) and information regarding the energies of the pixel (x−1, y+1) adjacent left below the pixel of interest (x, y), the pixel (x, y+1) adjacent immediately below the pixel of interest (x, y), and the pixel (x+1, y+1) adjacent right below the pixel of interest (x, y). The selection path setting unit 174 sets, as the selection path from the pixel of interest (x, y), the information regarding the pixel of interest (x, y) and the pixel with the minimum energy among the energies of the pixel (x−1, y+1) adjacent left below the pixel of interest (x, y), the pixel (x, y+1) adjacent immediately below the pixel of interest (x, y), and the pixel (x+1, y+1) adjacent right below the pixel of interest (x, y).

In step S179, the selection path setting unit 174 stores the information regarding the selection path in correspondence to the set pixel of interest (x, y) in the selection path storage unit 175.

In step S180, the adjacent energy comparison unit 172 sets the coordinates of the pixel of interest (x, y) as the coordinates selected as the selection path. That is, the adjacent energy comparison unit 172 sets the coordinates of the pixel with the minimum energy as the coordinates of the subsequent pixel of interest (x, y) among the pixel (x−1, y+1), the pixel (x, y+1), and the pixel (x+1, y+1). The process returns to step S176.

That is, the processes from step S176 to step S180 are repeated until the y coordinate reaches the height of the input image in step S176. For example, when it is determined that all of the energies of the pixel (x−1, y+1), the pixel (x, y+1), and the pixel (x+1, y+1) respectively adjacent left below, immediately below, and right below the pixel of interest (x, y) are not the maximum energy value in step S177, the following processes are sequentially performed by the processes from step S176 to step S180.

Figure 20:
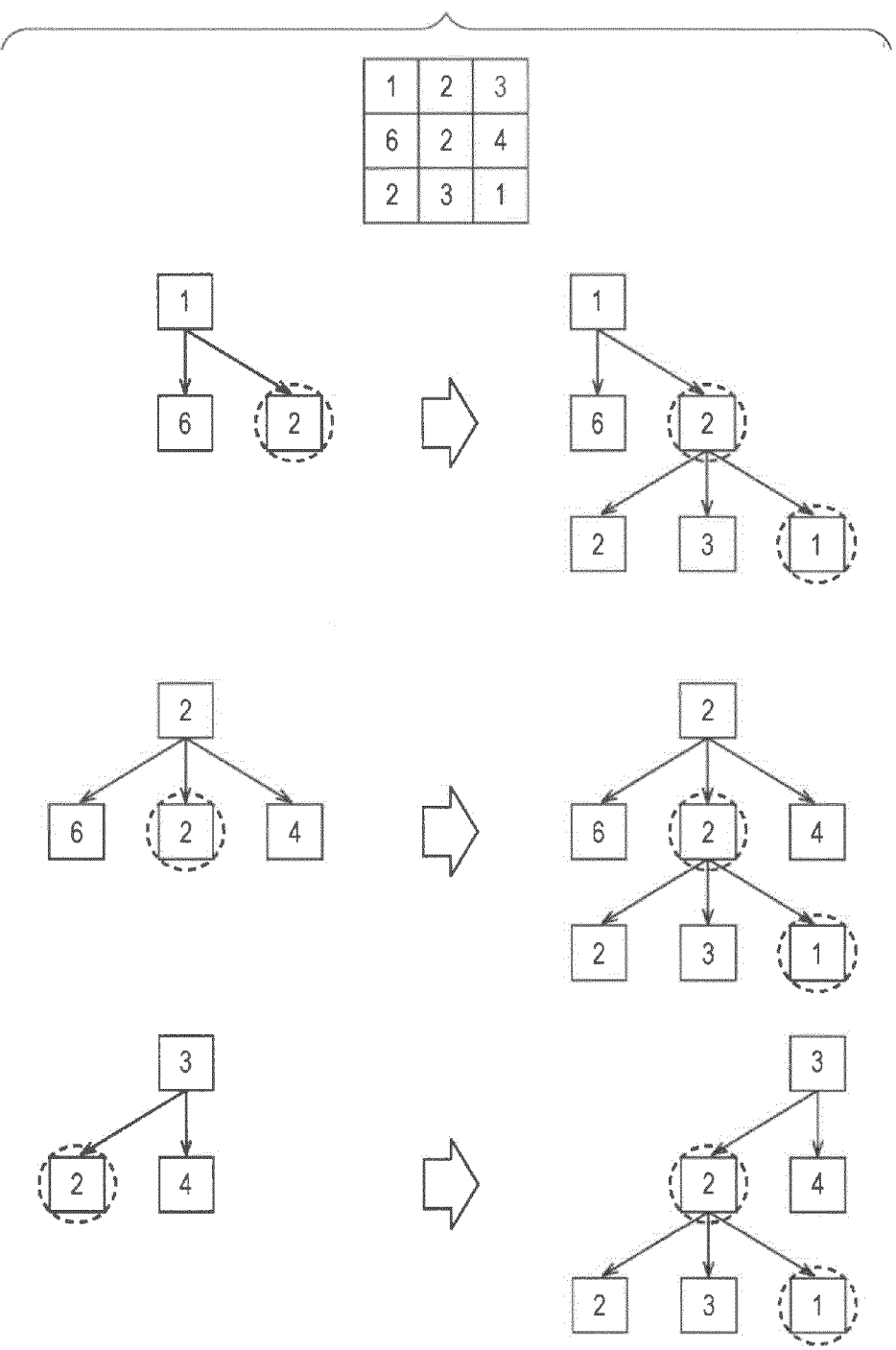
FIG. 20 is a diagram illustrating the process of searching the partial image.

For example, in a case of the input image energy map shown in the uppermost part of FIG. 20, the pixel with energy 1 located at the left upper end is initially set as the pixel of interest. At this time, since there is no pixel adjacent left below the pixel of interest, the pixel with the smaller energy is a pixel with energy 2 surrounded by a dotted line, as shown in the left side of the second part of FIG. 20, between the pixels located immediately below and right below the pixel of interest by the process of step S177, and this pixel is selected as the selection path.

In the subsequent process, since a pixel with energy 2 becomes the pixel of interest, a pixel with the minimum energy among the pixels adjacent left below, immediately below, and right below the pixel of interest is a pixel with energy 1 surrounded by a dotted line, as shown in the right side of the second part of FIG. 20, and this pixel is selected as the selection path.

Then, since the y coordinate reaches the height of the input image by the above process, the path, which is formed by a pixel group formed by sequentially connecting the pixel with energy 1 located at the left upper end, the pixel with energy 2 located in the middle, and the pixel with energy 1 located right below on the assumption that the pixel with energy 1 located at the left above is the start pixel of the partial seam, is set as a candidate of the partial seam in the input image energy map in FIG. 20, as shown in the right side of the second part of FIG. 20.

In step S176, when it is determined that the y coordinate is not smaller than the height of the input image and the y coordinate reaches the height of the input image, the process proceeds to step S185. In step S185, the selection path setting unit 174 calculates energy cumulative values of a plurality of pixel groups forming the paths set as candidates of the partial seam. Moreover, the selection path setting unit 174 stores information regarding the pixel group forming the candidate of the partial seam and the calculated cumulative value in correspondence with the start coordinates (xs, ys) in the selection path storage unit 175. That is, the candidate of the partial seam identified by the start coordinates (xs, ys) is stored as the information regarding the pixel group selected as the selection path in correspondence with the start coordinates (xs, ys) together with the cumulative energy in the selection path storage unit 175.

In step S186, the adjacent energy comparison unit 172 increases the xs coordinate of the start coordinates (xs, ys) by one, and the process returns to step S174.

Therefore, in the case of the input image energy map shown in the uppermost part of FIG. 20, pixels with energies 1, 2, and 3 from the left side of the upper stage are start pixels. Accordingly, when the processes from step S174 to step S180, the process of step S185, and the process of step S186 are repeated, the candidates of the partial seam are calculated for the pixels having the start coordinates, as below, and having energies 1, 2, and 3, in the case of FIG. 20.

The candidate of the partial seam in which the pixel with energy 1 is the start pixel is formed by the pixel with energy 1 located at the left upper end of the input image energy map shown in the second part of FIG. 20, as described above, the pixel with energy 2 located in the middle, and the pixel with energy 1 located at the right lower end. This candidate of the partial seam has cumulative energy 4. Moreover, the candidate of the partial seam in which the pixel with energy 2 is the start pixel is formed by the pixel with energy 2 located in the middle of the input image energy map shown in the left and right sides of third part of FIG. 20, the pixel with energy 2 located in the middle, and the pixel with energy 1 located at the right lower end. This candidate of the partial seam has cumulative energy 5. Furthermore, the candidate of the partial seam in which the pixel with energy 3 is the start pixel is formed by the pixel with energy 3 located at the right upper end of the input image energy map shown in the left and right sides of fourth part of FIG. 20, the pixel with energy 2 located in the middle, and the pixel with energy 1 located at the right lower end. This candidate of the partial seam has cumulative energy 6.

When it is determined that the xs coordinate of the start coordinates (xs, ys) is not smaller than (X+m), that is, exceeds the block calculated as the reduction seam in step S174, the process proceeds to step S187.

In step S187, the partial seam determination unit 176 determines the partial seam with the minimum cumulative energy as the partial seam among the candidates of the partial seam stored in the selection path storage unit 175, and stores information regarding the determined partial seam in the partial seam storage unit 177. Simultaneously, the partial seam determination unit 176 supplies the information regarding the determined partial seam to the maximum energy value insertion unit 181.

Figure 21:
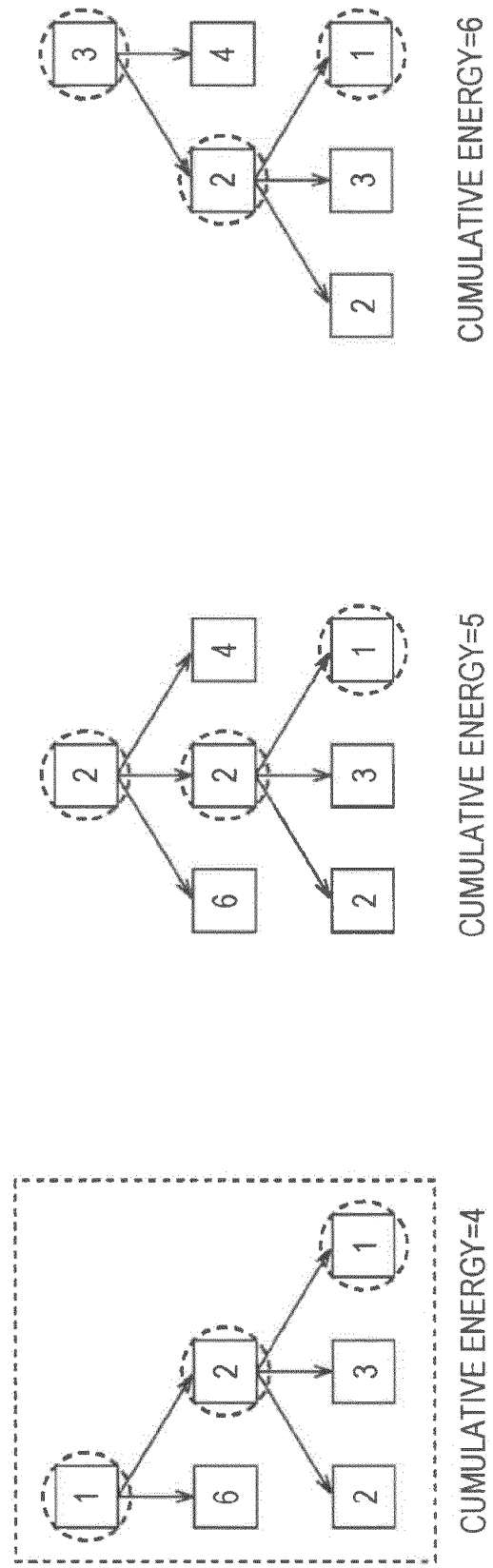
FIG. 21 is a diagram illustrating the process of searching the partial image.

That is, in the input image energy map shown in the uppermost part of FIG. 20, the start coordinates shown in the second part of FIG. 20 have the smallest cumulative energy of the candidate of the partial seam in which the pixel with energy 1 located at the left upper end is the start pixel, and thus is determined as the partial seam, as shown in FIG. 21. In FIG. 21, the path which corresponds to the second part of FIG. 20 and is surrounded by a dotted line shown in the left side is selected as the partial seam through comparison of the cumulative energies of the candidates of the partial seam shown in the second, third, and fourth parts of FIG. 20 in the order from the left side.

In step S188, the maximum energy value insertion unit 181 reads the input image energy map, inserts the maximum energy value as the energy of the coordinates of the pixel forming the partial seam, and then ends the process.

On the other hand, when it is determined that all of the energies of the pixel (x−1, y+1) adjacent left below the pixel of interest (x, y), the pixel (x, y+1) adjacent immediately below the pixel of interest (x, y), and the pixel (x+1, y+1) adjacent right below the pixel of interest (x, y) are the maximum energy value in step S177, the process proceeds to step S181.

In step S181, the adjacent energy comparison unit 172 notifies the non-adjacent energy comparison unit 173 that all of the energies of the pixels adjacent left below, immediately below, and right below the pixel of interest are the maximum. The non-adjacent energy comparison unit 173 determines whether the position (x+N) of the x coordinate obtained by adding N pixels to the x coordinate of the pixel of interest (x, y) is within the input image. For example, when the position (x+N) of the x coordinate obtained by adding N pixels to the x coordinate of the pixel of interest (x, y) is within the input image in step S181, the process proceeds to step S182.

In step S182, the non-adjacent energy comparison unit 173 sets (N−1) pixels continuously present on the right side from the pixel adjacent right below the pixel of interest, as the candidates used to select the selection path.

On the other hand, when the position (x+N) of the x coordinate obtained by adding N pixels to the x coordinate of the pixel of interest (x, y) is not within the input image in step S181, the process proceeds to step S184.

In step S184, the non-adjacent energy comparison unit 173 sets (N−1) pixels continuously present on the left side from the pixel adjacent left below the pixel of interest, as the candidates used to select the selection path.

In step S183, the non-adjacent energy comparison unit 173 selects the pixels with the minimum energy as the selection path among the (N−1) pixels continuously present on the right side from the pixel adjacent right below the pixel of interest and the (N−1) pixels continuously present on the left side from the pixel adjacent left below the pixel of interest.

That is, when the pixels adjacent right below, immediately below, and left below the pixel of interest have the maximum energy value within the input image, as shown in the left side of FIG. 22, the non-adjacent energy comparison unit 173 treats the (N−1) pixels continuously adjacent rightward to the pixel adjacent right below the pixel of interest as the pixels adjacent right below, immediately below, and left below of the pixel of interest, as shown in the right side of FIG. 22. In FIG. 22, (N−1) pixels=6 pixels are shown.

As this description has been made in the entire image search process, the pixel with the maximum energy value is a pixel which is highly likely to be selected as the partial seam, since the maximum energy value is also given to the pixels belonging to the calculated partial seam.

Figure 23:
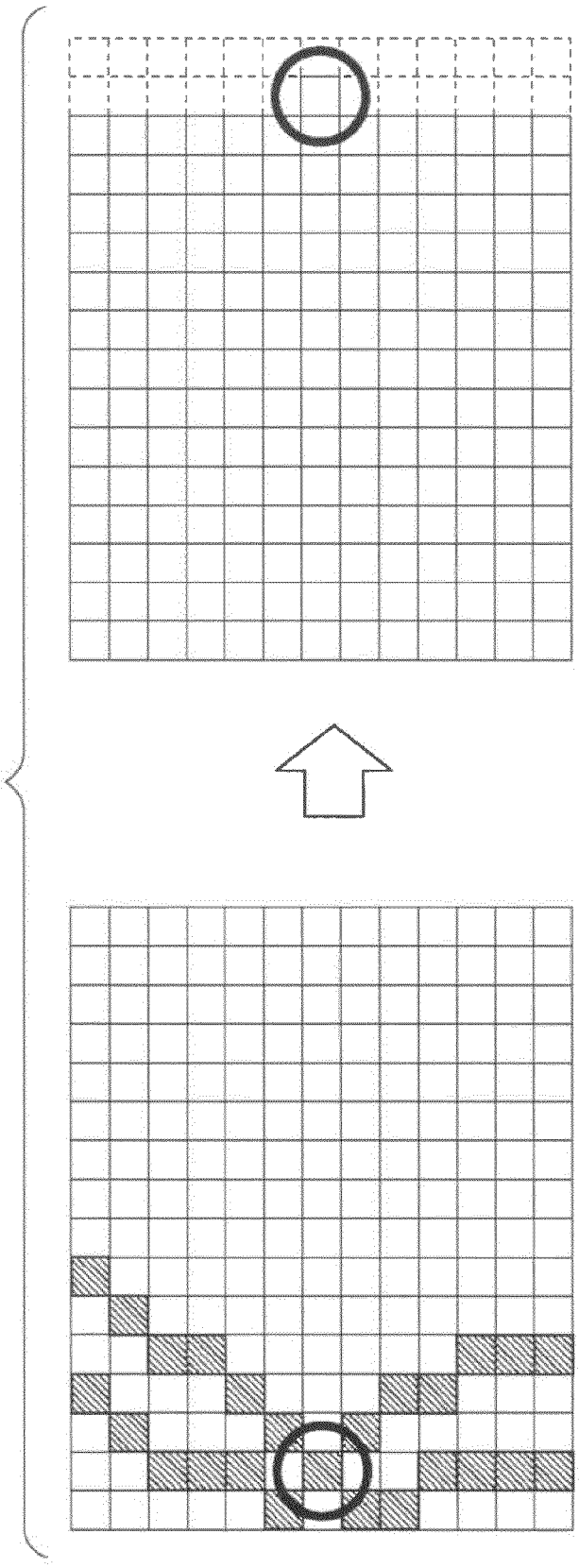
FIG. 23 is a diagram illustrating the process of searching the partial image.

For example, when a plurality of partial seams is selected, as shown in the left side of FIG. 23, there is a pixel belonging to both the partial seams at the intersection position when the partial seams intersect each other. In this case, when the pixel calculated as the plurality of partial seams is deleted, as shown in the right side of FIG. 23, the pixels may not be deleted by the number of partial seams in a row or a column including the pixel repeatedly belonging to the plurality of partial seams. As a consequence, a row or a column including the number of pixels different from that of another row or another column occurs, and thus unnecessary pixels may be generated.

Figure 24:
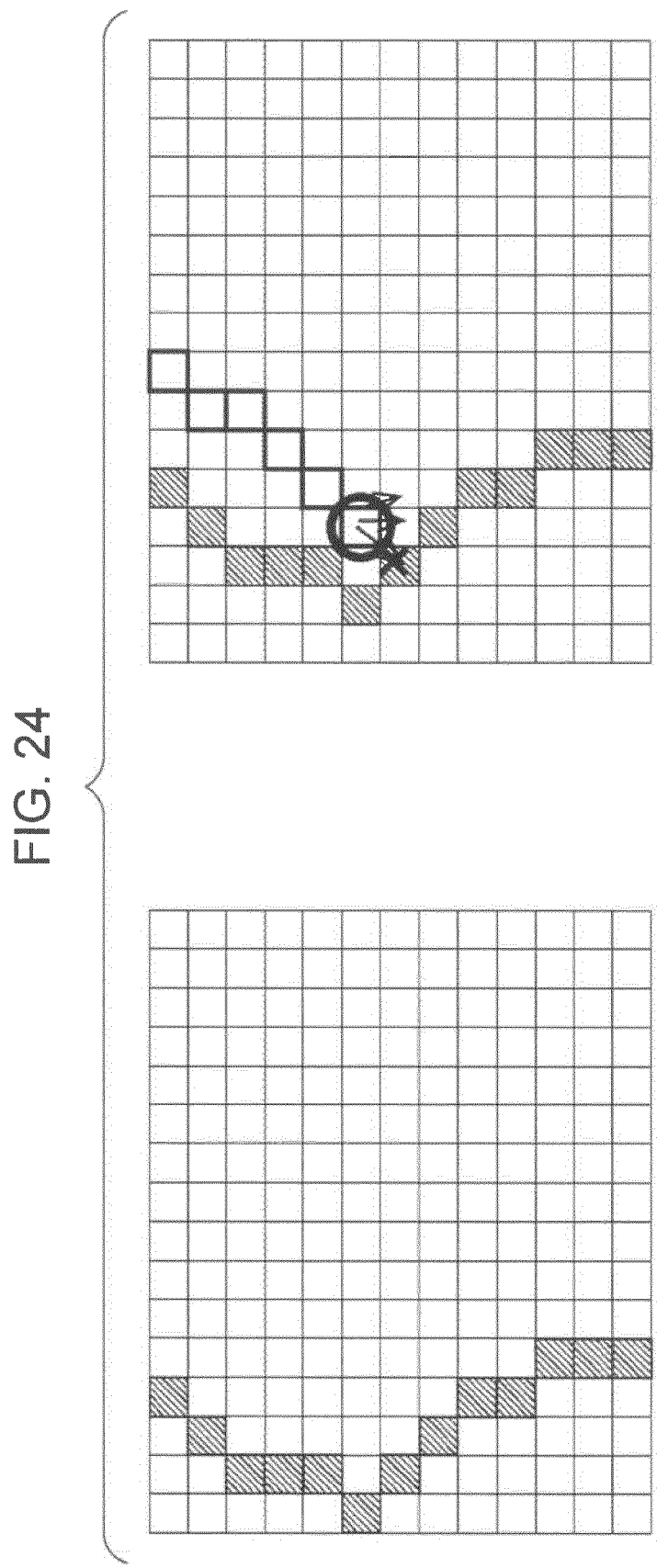
FIG. 24 is a diagram illustrating the process of searching the partial image.

For example, the maximum energy value indicated by a black color shown on the right side of FIG. 24 is set for the temporarily calculated partial seam indicated by diagonal lines shown on the left side of FIG. 24. In this case, even when the partial seam indicated by a thick line shown on the right side of FIG. 24 is calculated and the pixel located left below the pixel of interest indicated by a circle has the maximum energy value, the pixels located immediately below and right below the pixel of interest do not have the maximum value. Therefore, since either of the pixels can be selected as the selection path, the partial seams can be set so as not to intersect each other.

However, when the process of step S178 is simply performed, as shown in the left side of FIG. 20, either of pixels with the maximum energy value is selected as the selection path, and thus an unnecessary pixel may be generated.

Accordingly, when the pixels adjacent left below, immediately below, and right below the pixel of interest are pixels with the maximum energy value which are likely to be already calculated as the partial seam by performing the processes from step S182 to step S184, these pixels are excluded from the candidates of the selection path. In addition, a plurality of discontinuous pixels which is not adjacent to the pixel of interest and is adjacent to the pixels adjacent to the pixel of interest are set as candidates of the selection path. That is, the pixels which are actually not directly adjacent to the pixel of interest are treated as the pixels adjacent to the pixel of interest, and thus are considered as the candidates of the selection path. Among the pixels which are not directly adjacent to the pixel of interest and are the candidates of the selection path, the pixel with the minimum energy value is selected as the selection path. As a consequence, since there is low possibility that the same pixel becomes the pixel forming the plurality of partial seams, a so-called unnecessary pixel rarely is generated.

Then, referring back to the flowchart of FIG. 14, the description will be made.

When the partial image search process ends in step S132 and the partial seam is determined, the process proceeds to step S133.

In step S133, the cumulative energy threshold value determination unit 178 determines whether the cumulative energy of the partial seam recently stored in the partial seam storage unit 177 is larger than the predetermined threshold value. For example, when it is determined that the recent cumulative energy of the recent partial seam is not larger than the predetermined threshold value in step S133, the process proceeds to step S134.

In step S134, the intra-block partial seam number determination unit 179 determines whether the number of partial seams searched within the block forming the currently processed reduction seam among the partial seams stored in the partial seam storage unit 177 reaches the predetermined number of partial seams set in the block. For example, when the number of partial seams searched within the block forming the currently processed reduction seam among the stored partial seams does not reach the predetermined number of partial seams set in the block in step S134, the process returns to step S132. That is, since the number of partial seams originally calculated within the block forming the reduction seam is a predetermined number, the processes of step S132 and step S133 are repeated so as to continuously search the partial seams within the same block until the number of partial seams reaches the predetermined number.

On the other hand, when the number of partial seams searched within the block forming the currently processed reduction seam among the stored partial seams exceeds the predetermined number of partial seams set in the block in step S134, the process returns to step S131. That is, when the number of partial seams reaches the predetermined number of partial seams set within the block, the process returns to step S131 due to the fact that it is necessary to newly calculate a reduction seam again by the entire image search process and to perform the separate partial image search process on the newly calculated reduction seam.

For example, when it is determined that the cumulative energy of the recent partial seam is larger than the predetermined threshold value in step S133, the process proceeds to step S135. In step S135, the cumulative energy threshold value determination unit 178 controls the output unit 180 to output the information regarding all of the partial seams stored in the partial seam storage unit 177 to the processing unit 116.

The search process can be summarized as follows. That is, the entire image search process is first performed using the reduced image energy map corresponding to the reduced image in order to search the reduction seams. At this time, in the entire image search process, the reduction seams are searched according to the dynamic programming method, as described above. The reduction seam is calculated by the pixel unit for the reduced image, but the pixels of the reduced image correspond to the block of the plurality of pixels in the input image. Therefore, in terms of the input image, the reduction seam serves as the information restricting the search range of the partial seams to be calculated to some extent.

Next, the partial image search process is performed on the pixels in the range calculated as the reduction seam to calculate the partial seam. In the partial image search process, the partial seams are searched according to the greedy method. At this time, when the cumulative energy of the recently calculated partial seam is not larger than the predetermined threshold value and the predetermined number of partial seams set within the block is calculated, the reduction seam is calculated again by the entire image search process and the partial image search process is repeated in the same way.

When the cumulative energy of the recently calculated partial seam is larger than the predetermined threshold value, the information regarding the calculated partial seams is output and the image is processed based on the output partial seams.

By the above process, the partial seams are searched to delete the image. The reduction seam is first searched by the entire image search process, and then only the partial seams, in which the pixel forming the end of the block of the searched reduction seam is the start pixel, are searched. Therefore, since the detailed search range of the partial seams in the entire input image can be restricted, it is possible to reduce a calculation amount compared to the case where the partial seams are searched from the entire input image.

In the search of the partial seams in which a pixel at the end forming the block of the reduction seam searched in the entire image search process is the start pixel, the greedy method is used instead of the dynamic programming method. Accordingly, it is possible to reduce the calculation amount. Moreover, when the cumulative energy of the recently calculated partial seam is larger than the predetermined threshold value, the search of the partial seam is stopped. Therefore, since the search of the partial seam having the large cumulative energy and being likely to include a subject is suppressed, it is possible to reduce the size of an image without making a subject small, while preventing breakdown of an image in which a subject is cut.

Dynamic Programming Method and Greedy Method

Hereinafter, the dynamic programming method and the greedy method will be described. The dynamic programming method refers to a process of searching the reduction seam in the above-described entire image search process. The greedy method refers to a process of searching the partial seam in the above-described partial image search process.

Figure 25:
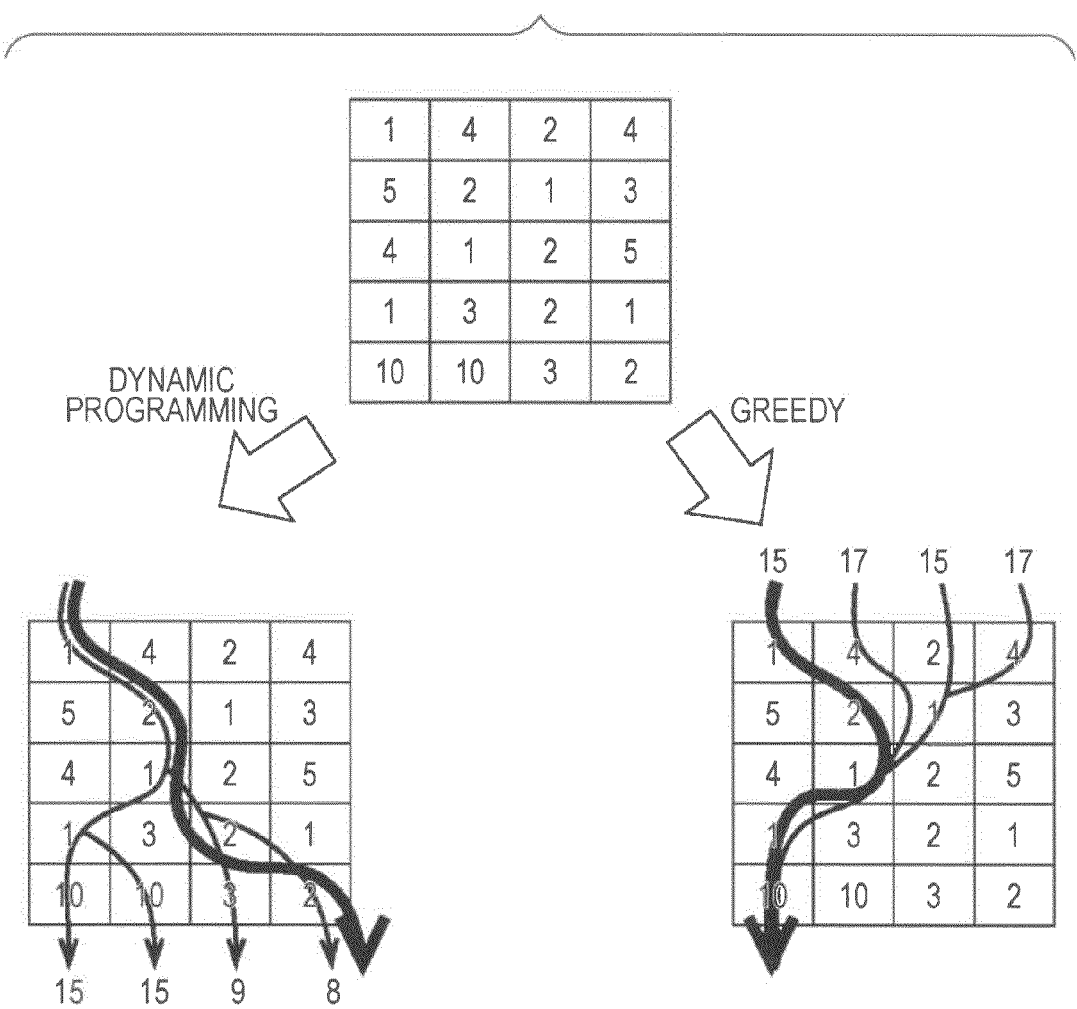
FIG. 25 is a diagram illustrating a dynamic programming method and a greedy method in the search process.

More specifically, when a seam with the minimum cumulative value of the energies of the pixels set as the selection path is searched in an energy map shown in the upper part of FIG. 25, the respective methods are used as follows. The energies of the pixels of the energy map shown in the upper part of FIG. 25 are 1, 4, 2, and 4 in the uppermost stage from the left side, are 5, 2, 1, and 3 in the second stage, are 4, 1, 2, and 5 in the third stage, are 1, 3, 2, and 1 in the fourth stage, and are 10, 10, 3, and 2 at the fifth stage.

When a seam is searched using the pixel with energy 1 located at the uppermost stage and the leftmost side as a start pixel, the cumulative energy map is first generated in the dynamic programming method. That is, the cumulative energy map is generated by sequentially downward repeating the process of cumulating the minimum energies among the energies of the pixels adjacent left above, immediately above and right above each pixel in the second stage from the upper side. As shown in the left lower part of FIG. 25, the seam, where the pixel with energy 1 located at the uppermost stage and leftmost side is the start pixel of a pixel group forming the selection path sequentially binding the pixel with the minimum cumulative energy among the end pixels and the start pixel, is selected as a candidate according to the cumulative energy map. The seam with the minimum cumulative energy is finally searched among the candidate seams calculated for all start pixels. As shown in the left lower part of FIG. 25, the seam with cumulative energy 8 indicated by a thick line is selected. As shown in the left lower part of FIG. 25, the cumulative energies of the pixels in the fifth stage are 15, 15, 9, and 8 from the left side.

According to the greedy method, on the other hand, as shown in the right lower part of FIG. 25, the pixels with the minimum energy among the energies of the pixels adjacent left below, immediately below, and right below each pixel are sequentially selected as the selection path in the energy map. Only one candidate seam is calculated from each start pixel and the seam with the minimum cumulative energy is finally selected from among the cumulative energies. As shown in the right lower part of FIG. 25, the cumulative energies of the seams of the start pixels in the uppermost stage are 15, 17, 15, and 17 for the respective start pixels from the left side. Accordingly, the seams of the start pixels with energy 1 or 2 in the uppermost stage are finally selected.

In comparison to the above processes, the cumulative energy map is temporarily calculated, the cumulative energies of the seams from all of the start pixels to all of the end pixels are compared to each other, and then the seam is selected according to the dynamic programming method. Therefore, as shown in the left lower part of FIG. 25, the seam with the minimum cumulative energy is selected with higher precision compared to the greedy method. However, the calculation amount is large, since the cumulative energy map is temporarily calculated and then the cumulative energies of the seams from all of the start pixels to all of the end pixels are calculated. In contrast, according to the greedy method, it is not necessary to calculate the cumulative energy map and the respective pixels are selected as the selection path under a given condition. Therefore, the calculation amount can be reduced. As shown in the right lower part of FIG. 25, however, the selection path is determined only for each pixel. Therefore, in effect, it is difficult to search the seam generated from the path along which the cumulative energy is the minimum.

In this embodiment, however, the dynamic programming method with higher precision is used in the entire image search process for the reduced image, thereby calculating the calculated reduction seam with relatively high precision. Since the entire image search process is performed for the reduced image according to the dynamic programming method, the calculation amount can be reduced compared to the process on the input image. Moreover, since the partial image search process of using the greedy method is performed only for the start pixels calculated as the reduction seam within the range, the partial seam is searched using the information regarding the reduction seam generated with the small calculation amount and calculated with relatively high precision. Therefore, the calculation speed can be improved while preventing the search precision of the partial seam from deteriorating.

When it is intended to improve the calculation speed, the greedy method may be used in the entire image search process. That is, when the greedy method is used in the entire image search process, it is not necessary to calculate the cumulative energy map or to compare the cumulative energies from all of the start pixels to all of the end pixels to each other and search the seams. Therefore, the calculation speed can be further improved.

The example has hitherto been described in which the seam is searched downward in the vertical direction in the input image. However, the pixels can be deleted or inserted in the horizontal direction by searching the seam in the horizontal direction in the same way. Moreover, by combining these methods, the input image can be reduced or expanded in the horizontal direction and the vertical direction.

Figure 26:
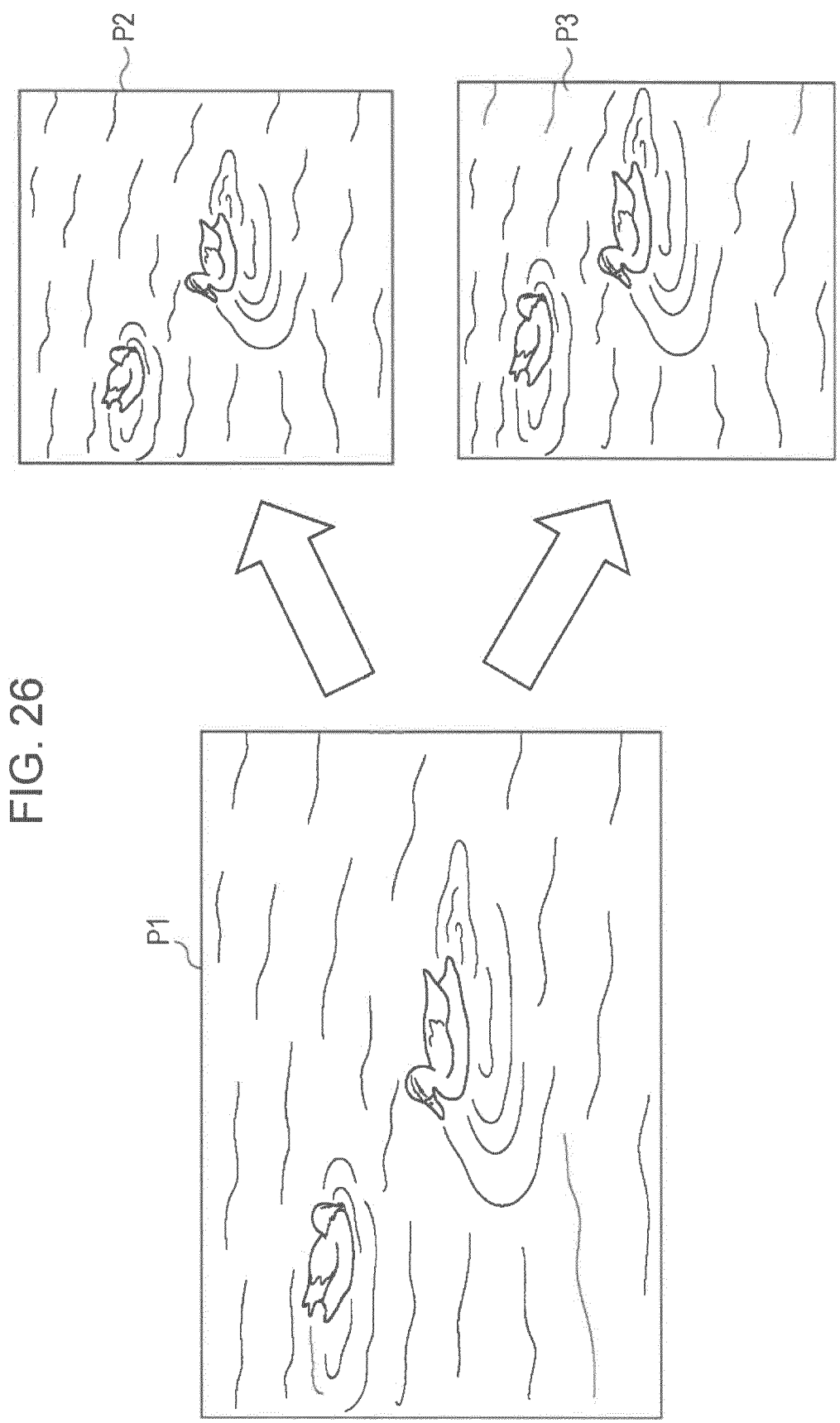
FIG. 26 is a diagram illustrating the processing result.

For example, when an input image formed by photographing two water birds shown in the left part of FIG. 26 is reduced in the horizontal direction and the vertical direction by predetermined scaling, as in an example according to the related art, the water birds are also reduced in the image according to an image reduction ratio, as shown in the right upper part of FIG. 26. However, when the above-described processes are used, as shown in the right lower part of FIG. 26, the image is reduced, but the sizes of the water birds are reduced less than the reduction ratio of the entire image. As a consequence, the size of the image is reduced, but a variation in the size of the water birds as subjects can be made to be smaller.

The above-described series of image processings may be executed by hardware or software. When the series of processes is executed by software, a program implementing the software is installed in a computer embedded with dedicated hardware or a computer such as a general personal computer, capable of installing various programs and executing various functions, from a program recording medium.

FIG. 27 is a diagram illustrating an exemplary configuration of a general personal computer. The personal computer has a CPU (Central Processing Unit) 1001 therein. An input/output interface 1005 is connected to the CPU 1001 via a bus 1004. A ROM (Read Only Memory) 1002 and a RAM (Random Access Memory) 1003 are connected to the bus 1004.

An input unit 1006 formed by an input device such as a keyboard or a mouse inputting an operation command of a user, an output unit 1007 outputting a processed operation screen or a processed image to a display device, a storage unit 1008 formed by a hard disk drive or the like storing programs or various kinds of data, and a communication unit 1009 formed by a LAN (Local Area Network) adapter and performing a communication process via a network such as the Internet which is a representative example are connected to the input/output interface 1005. A drive 1010 reading and writing data from and to a removable medium 1011 such as a magnetic disk (including a flexible disk), an optical disk (including a CD-ROM (Compact Disc-Read Only Memory) and a DVD (Digital Versatile Disc)), a magneto-optical disk (including an MD (Mini Disc)), or a semiconductor memory is connected to the input/output interface 1005.

The CPU 1001 executes various kinds of processes according to a program stored in the ROM 1002 or a program read from the removable medium 1011 such as a magnetic disk, an optical disk, a magneto-optical disk, or a semiconductor memory, installed in the storage unit 1008, and loaded from the storage unit 1008 to the RAM 1003. The RAM 1003 appropriately stores data necessary for the CPU 1001 to execute various kinds of processing.

In the specification, steps describing the program stored in a recording medium include not only processes chronologically performed according to a described order but also processes executed in parallel or separately, although not necessarily executed chronologically.

In the specification, a system refers to the entire apparatus configured by a plurality of apparatuses.

The present application contains subject matter related to that disclosed in Japanese Priority Patent Application JP 2010-040697 filed in the Japan Patent Office on Feb. 25, 2010, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus comprising:
    subject region detection means for detecting regions of subjects included in an input image;
    cropped region setting means for setting a region including all of the regions of the subjects detected by the subject region detection means as a cropped region;
    expansion region addition means for adding an expansion region to expand an end of the cropped region only by a predetermined width;
    cutting means for cutting a cut image formed from a cut region including the cropped region and the expansion region from the input image;
    subject adaptation size changing means for changing a size of an image formed from the cut region by deleting a region where an influence on the subjects is small in the cut image; and
    an entire image size changing means for changing the size of the entire image changed in size by the subject adaptation size changing means at a predetermined ratio,
    wherein the subject adaptation size changing means includes
    input image energy map generation means for generating an input image energy map from the cut image based on energies of adjacent pixels of the cut image,
    reduced energy map generation means for generating a reduced energy map corresponding to a reduced image, which is formed by setting one block formed by a plurality of adjacent pixels of the cut image as one pixel, by reducing the input image energy map,
    reduction seam search means for searching a reduction seam formed by binding pixels of a path along which a cumulative energy value is minimum among a plurality of paths formed from a pixel located at one end of the reduced image to pixels at the other end of the reduced image sequentially via the pixels adjacent in a direction of the other end in the reduced energy map,
    partial seam search means for searching a partial seam formed by binding pixels with a minimum cumulative value of the energies of the pixels among a plurality of paths formed from a pixel located at one end, which includes an end of the reduction seam searched by the reduction seam search means, of the cut image in the input image energy map to pixels located at the other end of the cut image sequentially via the pixels adjacent in a direction of the other end, and
    reduction means for reducing the input image by deleting the pixels forming the partial seam searched by the partial seam search means from the input image.

2. The image processing apparatus according to claim 1, further comprising:
    comparison means for comparing a cumulative value of the energies of the pixels forming the searched partial seam to a threshold value,
    wherein the partial seam search means repeatedly searches the partial seam formed by binding the pixels with the minimum cumulative value among the plurality of paths formed from a pixel located at one end, which includes the end of the reduction seam searched by the reduction seam search means, of the cut image in the input image energy map to the pixels located at the other end of the cut image sequentially via the pixels adjacent in the direction of the other end, until the comparison means determines that the cumulative value of the energies of the pixels forming the searched partial seam is larger than the threshold value.

3. The image processing apparatus according to claim 1, further comprising:
    input image energy map update means for updating the input image energy map by inserting and replacing a maximum energy value into the energies corresponding to all of the pixels, which form the partial seam searched by the partial seam search means, of the cut image on the input image energy map,
    wherein when the partial seam search means searches the plurality of paths formed from the pixel located at the one end of the cut image to the pixels located at the other end of the cut image sequentially via the pixels adjacent in the direction of the other end, the partial seam search means forms the paths by setting the pixels with the minimum energy as the adjacent pixels among a predetermined number of pixels adjacent to the adjacent pixels when all of the adjacent pixels have the maximum energy value of the input image energy map.

4. The image processing apparatus according to claim 1, further comprising:
   reduced image energy map update means for updating the reduced image energy map by inserting and replacing the maximum energy value into the energies corresponding to all of the pixels, which form the partial seam searched by the partial seam search means, of the reduced image on the reduced image energy map.

5. An image processing method of an image processing apparatus which includes
   subject region detection means for detecting regions of subjects included in an input image,
   cropped region setting means for setting a region including all of the regions of the subjects detected by the subject region detection means as a cropped region,
   expansion region addition means for adding an expansion region to expand an end of the cropped region only by a predetermined width,
   cutting means for cutting a cut image formed from a cut region including the cropped region and the expansion region from the input image,
   subject adaptation size changing means for changing a size of an image formed from the cut region by deleting a region where an influence on the subjects is small in the cut image, and
   an entire image size changing means for changing the size of the entire image changed in size by the subject adaptation size changing means at a predetermined ratio,
   the image processing method comprising the steps of:
   detecting, by subject region detection means, the regions of the subjects included in the input image;
   setting, by cropped region setting means, the region including all of the regions of the subjects detected in the step of detecting the subject region as the cropped region;
   adding, by expansion region addition means, the expansion region to expand the end of the cropped region only by the predetermined width;
   cutting, by cutting means, the cut image formed from the cut region including the cropped region and the expansion region from the input image;
   changing, by subject adaptation size changing means, the size of the image formed from the cut region by deleting the region where the influence on the subjects is small in the cut image; and
   changing, by the entire image size changing means, the size of the entire image changed in size in the step of changing the subject adaptation size at the predetermined ratio,
   wherein the changing by the subject adaptation size changing means includes
   generating an input image energy map from the cut image based on energies of adjacent pixels of the cut image;
   generating a reduced energy map corresponding to a reduced image, which is formed by setting one block formed by a plurality of adjacent pixels of the cut image as one pixel, by reducing the input image energy map,
   searching a reduction seam formed by binding pixels of a path along which a cumulative energy value is minimum among a plurality of paths formed from a pixel located at one end of the reduced image to pixels at the other end of the reduced image sequentially via the pixels adjacent in a direction of the other end in the reduced energy map,
   searching a partial seam formed by binding pixels with a minimum cumulative value of the energies of the pixels among a plurality of paths formed from a pixel located at one end, which includes an end of the reduction seam, of the cut image in the input image energy map to pixels located at the other end of the cut image sequentially via the pixels adjacent in a direction of the other end, and
   reducing the input image by deleting the pixels forming the partial seam searched by the partial seam search means from the input image.

6. A non-transitory computer-readable medium encoded with computer-readable instructions thereon, comprising:
   detecting regions of subjects included in an input image;
   setting a region including all of the detected regions of the subjects as a cropped region;
   adding an expansion region to expand an end of the cropped region only by a predetermined width;
   cutting a cut image formed from a cut region including the cropped region and the expansion region from the input image;
   changing a size of an image formed from the cut region by deleting a region where influence on the subjects is small in the cut image; and
   changing a size of an entire image at a predetermined ratio,
   wherein the changing of the size of the image formed from the cut region includes generating an input image energy map from the cut image based on energies of adjacent pixels of the cut image, generating a reduced energy map corresponding to a reduced image, which is formed by setting one block formed by a plurality of adjacent pixels of the cut image as one pixel, by reducing the input image energy map, searching a reduction seam formed by binding pixels of a path along which a cumulative energy value is minimum among a plurality of paths formed from a pixel located at one end of the reduced image to pixels at the other end of the reduced image sequentially via the pixels adjacent in a direction of the other end in the reduced energy map, searching a partial seam formed by binding pixels with a minimum cumulative value of the energies of the pixels among a plurality of paths formed from a pixel located at one end, which includes an end of the reduction seam, of the cut image in the input image energy map to pixels located at the other end of the cut image sequentially via the pixels adjacent in a direction of the other end, and reducing the input image by deleting the pixels forming the partial seam searched by the partial seam search means from the input image.

7. An image processing apparatus comprising:
   a processor including
      a subject region detection unit to detect regions of subjects included in an input image;
      a cropped region setting unit to set a region including all of the detected regions of the subjects as a cropped region;
      an expansion region addition unit to add an expansion region to expand an end of the cropped region only by a predetermined width;
      a cutting unit to cut a cut image formed from a cut region including the cropped region and the expansion region from the input image;
      a subject adaptation size change unit to change a size of an image formed from the cut region by deleting a region where an influence on the subjects is small in the cut image; and
      an entire image size changing unit to change a size of the entire image changed in size by the subject adaptation size change unit at a predetermined ratio,
      wherein the subject adaptation size change unit includes an input image energy map generation unit to generate an input image energy map from the cut image based on energies of adjacent pixels of the cut image, a reduced energy map generation unit to generate a reduced energy map corresponding to a reduced image, which is formed by setting one block formed by a plurality of adjacent pixels of the cut image as one pixel, by reducing the input image energy map, a reduction seam search unit to search a reduction seam formed by binding pixels of a path along which a cumulative energy value is minimum among a plurality of paths formed from a pixel located at one end of the reduced image to pixels at the other end of the reduced image sequentially via the pixels adjacent in a direction of the other end in the reduced energy map, a partial seam search unit to search a partial seam formed by binding pixels with a minimum cumulative value of the energies of the pixels among a plurality of paths formed from a pixel located at one end, which includes an end of the reduction seam searched by the reduction seam search unit, of the cut image in the input image energy map to pixels located at the other end of the cut image sequentially via the pixels adjacent in a direction of the other end, and a reduction unit to reduce the input image by deleting the pixels forming the partial seam searched by the partial seam search means from the input image.

* * * * *